US012730080B2

(12) United States Patent
Elbaum et al.

(10) Patent No.: US 12,730,080 B2
(45) Date of Patent: Sep. 8, 2026

(54) SYSTEM AND METHOD FOR EXTRACTION OF STRUCTURAL DATA OF A SAMPLE FROM SCAN DATA

(71) Applicant: YEDA RESEARCH AND DEVELOPMENT CO. LTD., Rehovot (IL)

(72) Inventors: Michael Elbaum, Tel-Aviv (IL); Shahar Seifer, Rehovot (IL); Lothar Houben, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 207 days.

(21) Appl. No.: 18/730,876

(22) PCT Filed: Feb. 9, 2022

(86) PCT No.: PCT/IL2022/050163

§ 371 (c)(1),
(2) Date: Jul. 22, 2024

(87) PCT Pub. No.: WO2023/152734

PCT Pub. Date: Aug. 17, 2023

(65) Prior Publication Data

US 2025/0116617 A1 Apr. 10, 2025

(51) Int. Cl.
*G01N 23/041* (2018.01)
*G01N 23/2251* (2018.01)

(52) U.S. Cl.
CPC ....... *G01N 23/041* (2018.02); *G01N 23/2251* (2013.01); *G01N 2223/401* (2013.01); *G01N 2223/50* (2013.01)

(58) Field of Classification Search
CPC ............ G01N 23/041; G01N 23/2251; G01N 2223/03; G01N 2223/33; G01N 2223/401;
(Continued)

(56) References Cited

U.S. PATENT DOCUMENTS 9,312,098 B2 4/2016 Lazic et al.
12,580,150 B2 * 3/2026 Straka .................. H01J 37/244

OTHER PUBLICATIONS

Bosch, E. G. T. & Lazić, I. (2019). Analysis of depth-sectioning STEM for thick samples and 3D imaging. Ultramicroscopy 207, 112831.

(Continued)

*Primary Examiner* — Jurie Yun
(74) *Attorney, Agent, or Firm* — Whitestone Law, PLLC

(57) ABSTRACT

Some embodiments relate to a computer system for determining a structural image of a sample. The computer system is configured to receive and process raw measured data produced by a scanning microscope and being indicative of at least one scan dataset $(I_M)_N$ acquired in a scan session and corresponding to a sequence of N measurements on a sample located in proximity to a focal plane of the scanning microscope. Each measurement includes data provided by M detection channels associated with M-segment detector (M≥3). The computer system includes a data analyzer capable of processing at least one scan dataset to compensate image shifts induced by off-axis detection channels for sample features at defocus plane to thereby obtain data indicative of parallax corrected scan image of the sample which enables separation between phase and depth information and extraction of a depth contrast image of the sample from the single scan dataset.

28 Claims, 22 Drawing Sheets

(58) Field of Classification Search
CPC ....... G01N 2223/414; G01N 2223/418; G01N 2223/42; G01N 2223/50
See application file for complete search history.

(56) References Cited

OTHER PUBLICATIONS

Maclaren, I., Macgregor, T. A., Allen, C. S. & Kirkland, A. I. (2020). Detectors-The ongoing revolution in scanning transmission electron microscopy and why this important to material characterization. APL Materials 8, 110901.
Maclaren, I., Wang, L., Mcgrouther, D., Craven, A. J., Mcvitie, S., Schierholz, R., Kovács, A., Barthel, J. & Dunin-Borkowski, R. E. (2015). On the origin of differential phase contrast at a locally charged and globally charge-compensated domain boundary in a polar-ordered material. Ultramicroscopy 154, 57-63.
Shibata, N., Findlay, S. D., Matsumoto, T., Kohno, Y., Seki, T., Sanchez-Santolino, G. & Ikuhara, Y. (2017). Direct Visualization of Local Electromagnetic Field Structures by Scanning Transmission Electron Microscopy. Accounts of Chemical Research 50, 1502-1512.
Nord, M., Webster, R. W. H., Paton, K. A., Mcvitie, S., Mcgrouther, D., Maclaren, I. & Paterson, G. W. (2020). Fast Pixelated Detectors in Scanning Transmission Electron Microscopy. Part I: Data Acquisition, Live Processing, and Storage. Microscopy and Microanalysis 26, 653-666.
Ophus, C. (2019). Four-Dimensional Scanning Transmission Electron Microscopy (4D-STEM): From Scanning Nanodiffraction to Ptychography and Beyond. Microscopy and Microanalysis 25, 563-582.
Elbaum, M. (2018). Quantitative Cryo-Scanning Transmission Electron Microscopy of Biological Materials. Advanced Materials 30, 1706681.
Sang, X., Lupini, A. R., Unocic, R. R., Chi, M., Borisevich, A. Y., Kalinin, S. V., Endeve, E., Archibald, R. K. & Jesse, S. (2016). Dynamic scan control in STEM: spiral scans. Advanced Structural and Chemical Imaging 2, 6.
Velazco, A., Nord, M., Béché, A. & Verbeeck, J. (2020). Evaluation of different rectangular scan strategies for STEM imaging. Ultramicroscopy 215, 113021.
Graaf, S. De, Momand, J., Mitterbauer, C., Lazar, S. & Kooi, B. J. (2020). Resolving hydrogen atoms at metal-metal hydride interfaces. Science Advances 6, eaay4312.
Lazić, I. & Bosch, E. G. T. (2017). Chapter Three—Analytical Review of Direct Stem Imaging Techniques for Thin Samples. In Advances in Imaging and Electron Physicsvol. 199, Hawkes, p. W. (Ed.), pp. 75-184. Elsevier.
D'Errico, J. (2013). Inverse (integrated) gradient (https://www.mathworks.com/matlabcentral/fileexchange/9734-inverse-integrated-gradient), MATLAB Central File Exchange.
Amandine, V., Cédric, M., Sergio, M. & Patricia, D. (2019). An ImageJ tool for simplified post-treatment of TEM phase contrast images (SPCI). Micron 121, 90-98.
Zhang W, Guo W, Zhang C & Zhao S (2019). An Improved Method for Spot Position Detection of a Laser Tracking and Positioning System Based on a Four-Quadrant Detector. Sensors 19, 4722.
Seifer Shahar et al: "Flexible STEM with Simultaneous Phase and Depth Contrast", Microscopy and Microanalysis, vol. 27, No. 6, Oct. 11, 2021 (Oct. 11, 2021), pp. 1476-1487.
Moore Kalani et al: "Aberration corrected STEM techniques to investigate polarization in ferroelectric domain walls and vortices", APL Materials, American Institute of Physics, 2 Huntington Quadrangle, Melville, NY 11747, vol. 9, No. 2, Feb. 11, 2021 (Feb. 11, 2021).
Aug. 30, 2022 Written Opinion and International Search Report.

* cited by examiner

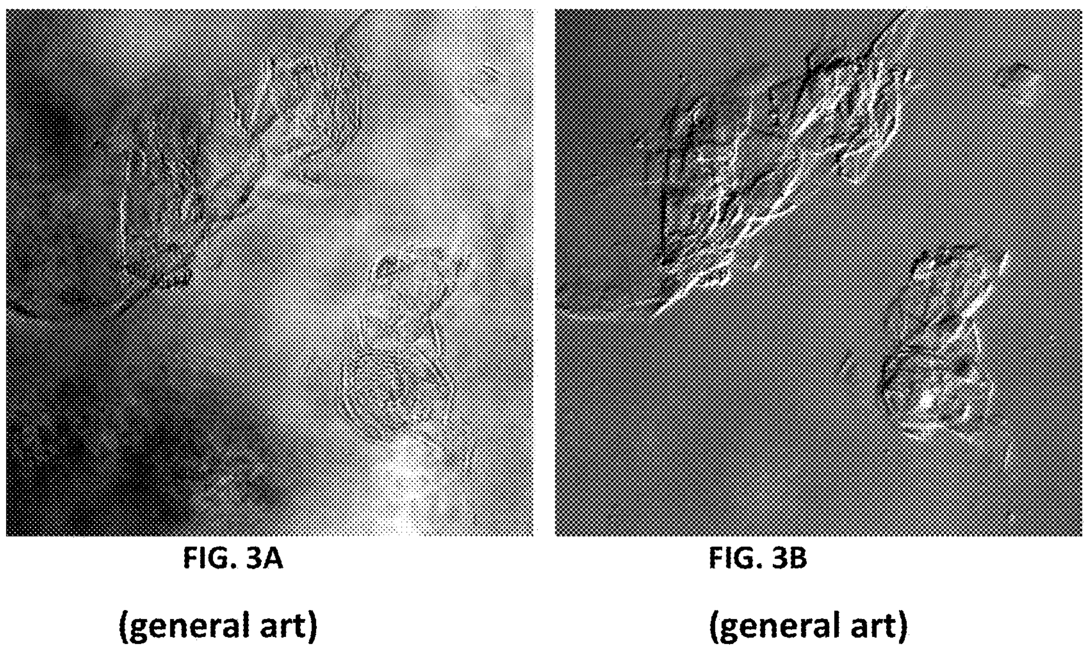
FIG. 3A
(general art)
FIG. 3B
(general art)
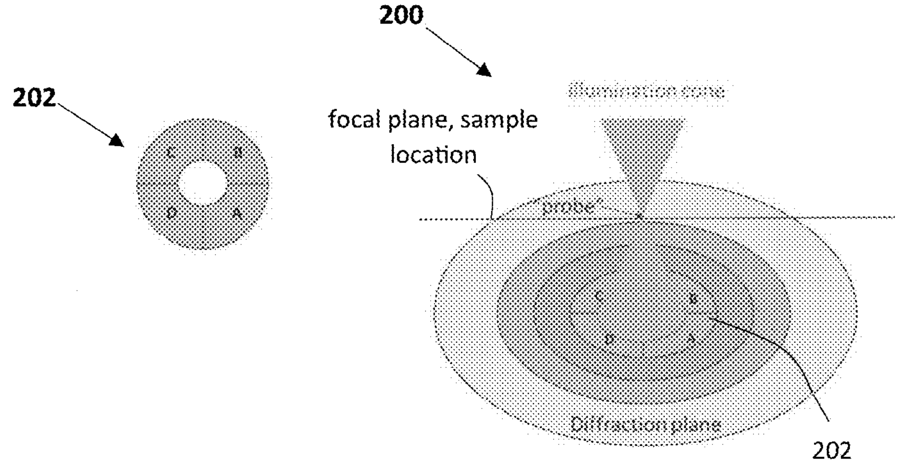
FIG. 4A

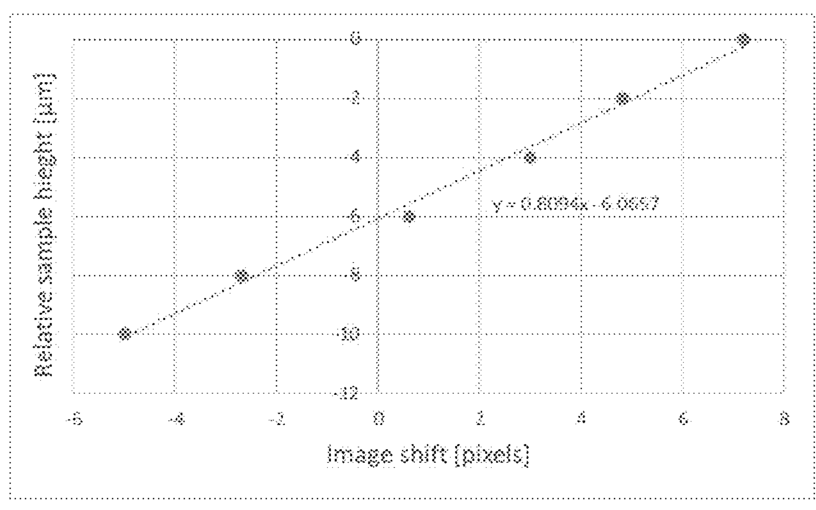
FIG. 6
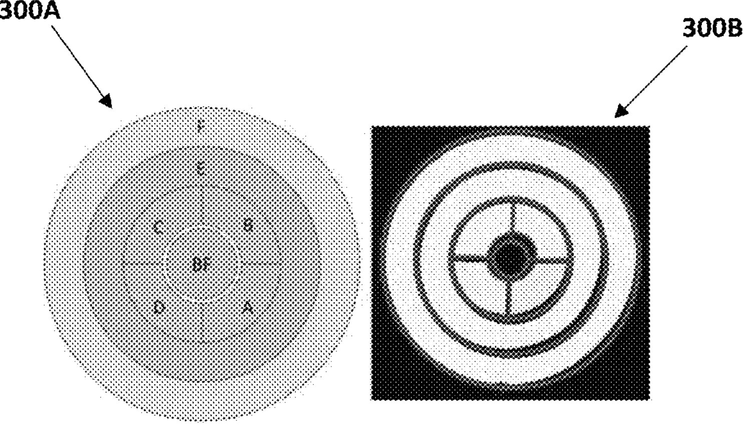
Fig. 7A
Fig. 7B

FIG. 9B
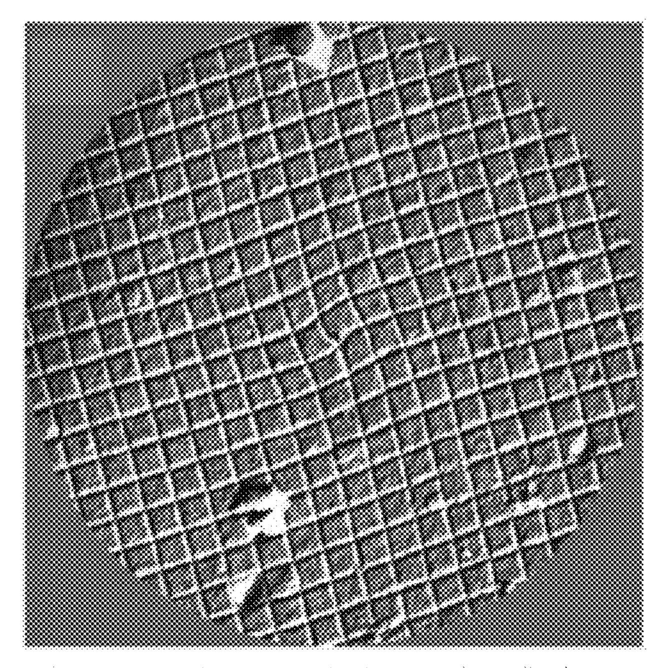
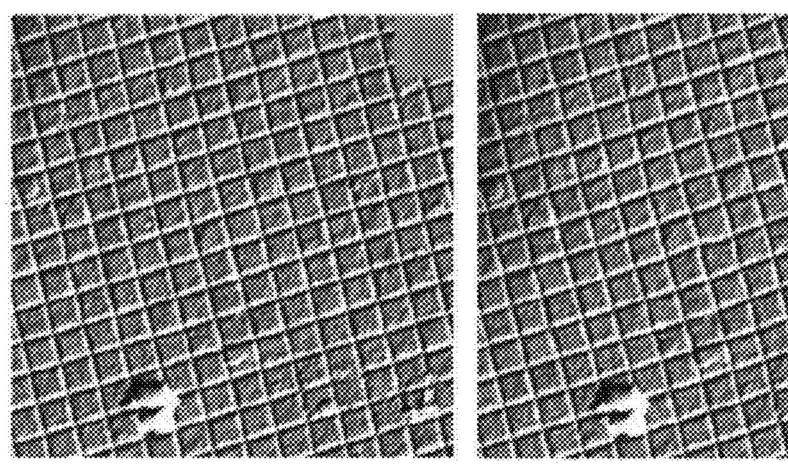
FIG. 9C
FIG. 9D

SYSTEM AND METHOD FOR EXTRACTION OF STRUCTURAL DATA OF A SAMPLE FROM SCAN DATA

CROSS-REFERENCE TO RELATED APPLICATIONS

This application is a national phase filing under 35 C.F.R. § 371 of and claims priority to PCT Patent Application No. PCT/IL2022/050163, filed on Feb. 9, 2022, the content of which is hereby incorporated in its entirety by reference.

TECHNOLOGICAL FIELD

The presently disclosed subject matter is in the field of inspection of samples by scanning microscopy and relates to a system and method of scan image data analysis aimed at extracting structural data about the sample.

BACKGROUND ART

References considered to be relevant as background to the presently disclosed subject matter are listed below:

1. Bosch, E. G. T. & Lazić, I. (2019). Analysis of depth-sectioning STEM for thick samples and 3D imaging. *Ultramicroscopy* 207, 112831.
2. MacLaren, I., Macgregor, T. A., Allen, C. S. & Kirkland, A. I. (2020). Detectors—The ongoing revolution in scanning transmission electron microscopy and why this important to material characterization. *APL Materials* 8, 110901.
3. MacLaren, I., Wang, L., McGrouther, D., Craven, A. J., McVitie, S., Schierholz, R., Kovács, A., Barthel, J. & Dunin-Borkowski, R. E. (2015). On the origin of differential phase contrast at a locally charged and globally charge-compensated domain boundary in a polar-ordered material. *Ultramicroscopy* 154, 57-63
4. Shibata, N., Findlay, S. D., Matsumoto, T., Kohno, Y., Seki, T., Sánchez-Santolino, G. & Ikuhara, Y. (2017). Direct Visualization of Local Electromagnetic Field Structures by Scanning Transmission Electron Microscopy. *Accounts of Chemical Research* 50, 1502-1512.
5. Nord, M., Webster, R. W. H., Paton, K. A., McVitie, S., McGrouther, D., MacLaren, I. & Paterson, G. W. (2020). Fast Pixelated Detectors in Scanning Transmission Electron Microscopy. Part I: Data Acquisition, Live Processing, and Storage. *Microscopy and Microanalysis* 26, 653-666.
6. Ophus, C. (2019). Four-Dimensional Scanning Transmission Electron Microscopy (4D-STEM): From Scanning Nanodiffraction to Ptychography and Beyond. *Microscopy and Microanalysis* 25, 563-582.
7. Elbaum, M. (2018). Quantitative Cryo-Scanning Transmission Electron Microscopy of Biological Materials. *Advanced Materials* 30, 1706681.
8. Sang, X., Lupini, A. R., Unocic, R. R., Chi, M., Borisevich, A. Y., Kalinin, S. V., Endeve, E., Archibald, R. K. & Jesse, S. (2016). Dynamic scan control in STEM: spiral scans. *Advanced Structural and Chemical Imaging* 2, 6.
9. Velazco, A., Nord, M., Béché, A. & Verbeeck, J. (2020). Evaluation of different rectangular scan strategies for STEM imaging. *Ultramicroscopy* 215, 113021.
10. Graaf, S. de, Momand, J., Mitterbauer, C., Lazar, S. & Kooi, B. J. (2020). Resolving hydrogen atoms at metal-metal hydride interfaces. *Science Advances* 6, eaay4312.
11. Lazić, I. & Bosch, E. G. T. (2017). Chapter Three—Analytical Review of Direct Stem Imaging Techniques for Thin Samples. In *Advances in Imaging and Electron Physics* vol. 199, Hawkes, P. W. (Ed.), pp. 75-184. Elsevier.
12. D'Errico, J. (2013). Inverse (integrated) gradient (https://www.mathworks.com/matlabcentral/fileexchange/9734-inverse-integrated-gradient), MATLAB Central File Exchange.
13. Amandine, V., Cédric, M., Sergio, M. & Patricia, D. (2019). An ImageJ tool for simplified post-treatment of TEM phase contrast images (SPCI). *Micron* 121, 90-98.
14. Zhang W, Guo W, Zhang C & Zhao S (2019). An Improved Method for Spot Position Detection of a Laser Tracking and Positioning System Based on a Four-Quadrant Detector. Sensors 19, 4722.

Acknowledgement of the above references herein is not to be inferred as meaning that these are in any way relevant to the patentability of the presently disclosed subject matter.

BACKGROUND

Inspection of samples/specimens by scanning microscopy, in particular scanning transmission electron microscopy (STEM), is based on instantaneous measurements of electron flux as the specimen is illuminated by a focused probe.

Tomographic scans acquired with an integrated Center of Mass (iCOM) detector provide direct way to map the electro-optic refractive index in a sample [1]. COM may be defined as the first moment of the projected intensity and is measured conveniently using a pixelated detector in 4D STEM [2]. The refractive index is directly related to the local electric potential, which at sufficient resolution could reveal atomic number and possibly molecular charge as long as intensity modulations within the primary diffraction disc are taken care of [3].

STEM with pixelated detector can be used to acquire the entire scattering or diffraction pattern for each scanned point [5,6]. This approach offers the greatest versatility as virtual detectors may be defined post-acquisition. The primary limitation of 4D STEM is speed, which requires a compromise between dynamic range and spatial sampling, given that the entire camera must be read for each pixel. A more subtle issue arises for low-dose applications such as cryo-STEM [7] in that the number of measurement elements may exceed the number of illuminating electrons for a practical scan rate and real space pixel density.

U.S. Pat. No. 9,312,098 describes a method of examining a sample in a charged-particle microscope. According to this technique, a beam of charged particles is directed from a source through an illuminator to irradiate the sample and scans across a surface of the sample, and a detector comprising a plurality of detection segments is used to collect transmitted electrons. An output of the detector is recorded as a function of scan position, resulting in accumulation of a charged-particle image of the sample. Signals from different segments of the detector are combined to produce a vector output from the detector at each scan position. Such vector field is mathematically processed by subjecting it to a two-dimensional integration operation, thereby producing an integrated vector field image.

GENERAL DESCRIPTION

There is a need in the art of imaging techniques for imaging various samples to enable extraction of as much as possible information about the sample's structure with reduced number of imaging sessions and thus also reducing the amount of image data. This is even more essential when inspecting delicate or radiation-sensitive samples using scanning microscopy (electron beam scanning or optical scanning).

The presently disclosed subject matter provides a novel approach for data analysis of image data collected by a scanning transmission microscope. According to the technique of the presently disclosed subject matter, the structural data of a sample (3D data) located in proximity to the focal plane of the scanning radiation beam can be directly obtained by analysis of a single-scan image data which is detected by a multi-segment detector.

The term "segmented detector" used herein refers to azimuthally segmented detector representing corresponding detection channels. Such detector is typically used to provide differential phase contrast (DPC) data. For the purposes of the present application, a segmented detector may be constituted by a pixelated detector (array/matrix of pixels), where multiple groups of pixels around a central region represent respective multiple segments of the detector, in which case the detection channel data (readout of the detector segment) is obtained by summation of the signals detected by the pixels of the respective group. In other words, with the use of an array detector, the detection channel is represented by a virtual detector segment formed by appropriate summation of the pixel elements of the array detector.

The presently disclosed subject matter provides for analysis of the scan data obtained in a transmission microscope, which may utilize charged particles' radiation (typically electron beam) or optical radiation or X-ray radiation. Generally, the scan mode is implemented via a relative displacement between the radiation beam and the sample.

Considering electron or optical transmission microscope, the scan mode is typically implemented by movement of the radiation beam with respect to a stationary/fixed sample position. In the case of X-ray transmission microscope, it is typical that the scan mode is implemented using a raster movement of a sample (sample stage) when the X-ray beam is fixed.

The data analysis techniques of the presently disclosed subject matter provides for extracting the depth contrast image of a sample from the single scan dataset of the sample, i.e. a sequence of N measurements (e.g. measured points) on a sample obtained by an M-segment detector in a single scan session. To this end, the single-scan dataset $(I_M)_N$ is processed to extract two parts related to different contributions of the signal being detected, one part corresponding to the true phase contrast (related to phase delay of the coherent illumination being detected by off-axis detector segments) and the other part corresponding to depth contrast being expressed in defocus aberration effects.

The inventors have demonstrated the capabilities of this technique for contrast enhancement by comparison and combination of multiple, simultaneously acquired detector signals.

Thus, according to one broad aspect of the presently disclosed subject matter, it provides a computer system for determining a structural image of a sample, the computer system being configured for data communication with a measured data provider to receive raw measured data produced by a scanning microscope, the raw measured data being indicative of at least one scan dataset acquired in a scan session, the scan dataset $(I_M)_N$ corresponding to a sequence of N measurements on a sample located in proximity to a focal plane of the scanning microscope, each measurement including data provided by M detection channels associated with M-segment detector ($M \geq 3$), the computer system comprising a data analyzer configured and operable to process said at least one scan dataset to compensate image shifts induced by off-axis detection channels for sample features at defocus plane to thereby obtain data indicative of parallax corrected scan image of the sample which enables separation between phase and depth information and extraction of a depth contrast image of the sample from the single scan dataset.

Preferably, the scan dataset includes about 9 or more measurements. The detector may include 3 or more detection segments.

The depth contrast image of the sample comprises signed intensity, bright and dark, indicative of a degree of defocus.

The data analyzer comprises a first data processor adapted to determine, from the scan dataset $(I_M)_N$, data indicative of a parallax corrected scan image of the sample, termed here as deshifted $DPC^{ds}$. This data processor is preferably further adapted to calculate, from this data indicative of the parallax corrected scan image of the sample, an integrated differential phase contrast image, $iDPC_1$, which provides more accurate mapping of the electro-optic refractive index of the sample than the known integrated differential phase contrast iDPC, owing to removal of defocus related artifacts.

In some embodiments, the data analyzer comprises also includes a second data processor adapted to process the raw scan dataset $(I_M)_N$ to calculate the integrated differential phase contrast image, iDPC, and determine a depth contrast image from a difference between the iDPC and $iDPC_1$, in which the signed intensity, bright or dark, represents the degree of defocus indicative of the depth of features in the sample.

In some embodiments, a depth-labeled phase contrast image is formed by displaying the $iDPC_1$ information with different labeling according to the depth of features in the sample, which is found from the scan dataset $(I_M)_N$. For example, the labeling can include color scale in a 2D image or recording the features in different slices of a 3D image file.

More specifically, in some embodiments, the first data processor processes the scan dataset $(I_M)_N$ and determines deshifted scan dataset $(I_1^{ds}, \ldots I_N^{ds})_N$, in which image shifts induced by off-axis detection channels for sample features at defocus plane are compensated; and then processes the deshifted scan dataset to determine corresponding differential phase contrast data ($DPC^{ds}$), thereby providing data indicative of a parallax corrected scan image of the sample. This may be implemented as follows:

- identifying, in the scan dataset $(I_M)_N$; image $I_i(x,y)$ acquired by each i-th detection channel based on the N measurements along the scan, by mapping locations in the image according to a locations of a focused scan beam in a focal plane;
- processing at least some of the images $I_i(x,y)$ to determine an image shift $(\Delta x_i, \Delta y_i)$ between $I_i(x,y)$ and a hypothetical image corresponding to a central detection channel collectable by a central region of the detector on an optical axis defined by illumination path of the microscope,
- determining an opposite shift value and applying said opposite shift value to the image provided by each i-th detection channel $I_i(x,y)$ to thereby obtain deshifted scan dataset $(I_1^{ds}, \ldots I_M^{ds})$; and
- processing the deshifted images $(I_1^{ds}(x,y) \ldots I_m^{ds}(x,y))$ for all the detection channels to determine differential phase contrast data ($DPC^{ds}$), thereby compensating for defocus image shifts induced by the off-axis detection channels and provide data indicative of a parallax corrected scan image of the sample.

The opposite shift value may be determined as an average shift obtained from measurements by each of M detection channels along the scan, applied with an opposite sign to respective image $(I_i(x,y))_N$.

In some embodiments, the data analyzer is further configured to determine a sum of intensity signals of deshifted images $(I_1^{ds}(x,y) \ldots I_m^{ds}(x,y))$ for all M detection channels, in each of said N measurements of the scan dataset thereby providing extended depth of field.

The depth of features in the sample can be found from processing the image shifts $(\Delta x_i, \Delta y_i)$ in patches (regions of interest) around the features, based on the defocus $\Delta z$ calculation. The degree of defocus $\Delta z$ may be implemented by applying a model based analysis to the image shift $(\Delta x_i, \Delta y_i)$ data, using a predetermined model describing a relation between an image shift and defocus and dominant aberrations. The features may be isolated by segmentation techniques in image processing and thus process the image shifts one feature at a time. The defocus $\Delta z$ provides the depth of feature to provide said depth-labeled phase contrast image.

The determination of the image shift $(\Delta x_i, \Delta y_i)$ may be performed as follows: calculating intersegment cross-correlations between $I_i$ and $I_j$ for at least some of pairs ij of the detection channels in at least some of the N measurements and determining $\Delta x_{ij}$ and $\Delta y_{ij}$; and determining the image shift $(\Delta x_i, \Delta y_i)$ from a best fit condition, The presently disclosed subject matter may be used for analysis of the raw measured data obtained from a scanning transmission electron microscope (STEM) utilizing the M-segment detector; or said raw measured data obtained by a scanning confocal microscope utilizing the M-segment detector.

The computer system may be configured for the data communication with a storage device where the raw measured data is stored and provided, where the storage device may be associated with a scanning microscope performing said measurements or may be associated with a stand-alone system.

According to another broad aspect of the presently disclosed subject matter, it provides an imaging system comprising: a scanning microscope unit including a scan unit for probing a sample plane by focused radiation and a detection unit comprising an M-segment detector (M≥3) located in a Fourier plane with respect to a focal plane of the scan unit for detecting the radiation transmitted through the sample and generating measured data comprising scan dataset $(I_M)_N$ corresponding to a sequence of N measurements on a sample located in proximity to a focal plane of the scanning microscope acquired in a scan session, each measurement including M detection channels associated with said M-segment detector; and a control unit comprising the above-described computer system.

As described above, the radiation may be electron beam radiation or optical radiation. The scan unit may perform a scan of any known suitable pattern (raster scan, circular or spiral-like scan, etc.).

The detection unit may include, in addition to said M-segment detector, a central detector located downstream of said M-segment detector and aligned with a central hole in said M-segment detector.

It should be noted that the detection may additionally include one or more detectors located downstream of and/or upstream of and/or surrounding said segmented detector. For example, the upstream detector may collect secondary emission (e.g. optical fluorescence or X-ray emission); downstream detector may be aligned with a central hole of the segmented detector; surrounding detector may be annular detector operable as high angle annular dark field (HAADF) detector.

According to yet further broad aspect, of the presently disclosed subject matter, it provides a method for use in reconstruction of a structural image of a sample, the method comprising:

Providing raw measured data indicative of at least one scan dataset $(I_M)_N$, the scan dataset being obtained in a scan session performed by a scanning microscope and corresponding to a sequence of N measurements on a sample located in proximity to a focal plane of the scanning microscope, each measurement including data acquired by M detection channels associated with M-segment detector (M≥3);

processing and analyzing said at least one scan dataset to compensate for defocus image shifts induced by off-axis detection channels to thereby obtain data indicative of parallax corrected scan image of the sample which enables separation between phase and depth information and extraction of a depth contrast image of the sample from the single scan dataset.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3A and 3B Fibroblast cells' images obtained using the state of the art confocal scanning microscope in simple light collection during transmitted light scan (FIG. 3A) (b) after applying Differential Interfering Contrast (DIC) filtering (FIG. 3B);

FIGS. 4A and 4B exemplify the technique of the presently disclosed subject matter implemented using the principles of confocal microscope, wherein FIG. 4A shows the general principles of the light detection scheme in a confocal scanning microscope and how it can be used for the purposes of the presently disclosed subject matter; and FIG. 4B shows the specification of the elements in the multi-segment detector (shaded area) and an outer circle that can be determined by the cone of illumination;

FIGS. 5A-5D show the results of experiments conducted by the inventors, comparing the technique of the presently disclosed subject matter with the DIC filteration method, wherein FIG. 5A shows iDPC image data calculated from the raw measured data, FIG. 5B shows the deshifted iDPC (iDPC1) calculated from the original images after applying the deshifting (refocusing) processing; FIG. 5C shows iDPC2 image corresponding to difference between iDPC of FIG. 5A and iDPC1 and reveals a clear image of the cells, which resembles the DIC filtered image of FIG. 5D;

FIG. 6 illustrates a plot of the image shifts obtained at several values of defocus which reveals the predicted linear relation;

FIGS. 7A and 7B exemplify a detector suitable to be used in multi-channel detection mode in a STEM enabling the analysis of the scan dataset in accordance with the presently disclosed subject matter, wherein FIG. 7A shows a detector with an aperture in the center for a separate Bright Field (BF) detector or EELS spectrometer, inner four-quadrant (A-D) and outer annular ring (E,F) segments; and FIG. 7B shows montage of a specific 6-channel segments acquired in a real-space scan showing the uniformity of detector response;

FIGS. 9A to 9D exemplify a pattern of the sequence of scan points, i.e. a pseudo-spiral scan (FIG. 9A); uncorrected full span of a 10 sec scan, i.e. the spiral scan with full circular margins circumscribing a square image (FIG. 9B), and two examples of correction for central region of a 10 s scan (FIG. 9C) and correction for central region of a 5 sec frame times (FIG. 9D) according to the inductive model of FIG. 8;

FIGS. 14A-14D show the transmission images of boron nitride nanotubes computed from the quadrant (segments A-D) and ADF (segment E) data of detector of FIG. 7B, wherein FIG. 14A shows the iDPC phase shift by Fourier analysis (iDPCFT); FIG. 14B shows the iDPC phase shift by real-space integration (iDPCRS); FIG. 14C shows the ADF scan (ADF); and FIG. 14D shows the Difference image from the sum of segments A-D at two defocus settings (Δf);

FIGS. 17A-17H illustrate computed iDPC signals, wherein FIGS. 17A-17D show the $iDPC_{\varphi}$ (iDPC1) part calculated based on aligned quadrant images, where the parallax contribution is compensated computationally (by "de-shifting"), and FIGS. 17E-17H show the second part, $iDPC_{\varphi^2}$ (iDPC2) calculated from the remainder of the iDPC signal;

DETAILED DESCRIPTION OF EMBODIMENTS

Figure 1:
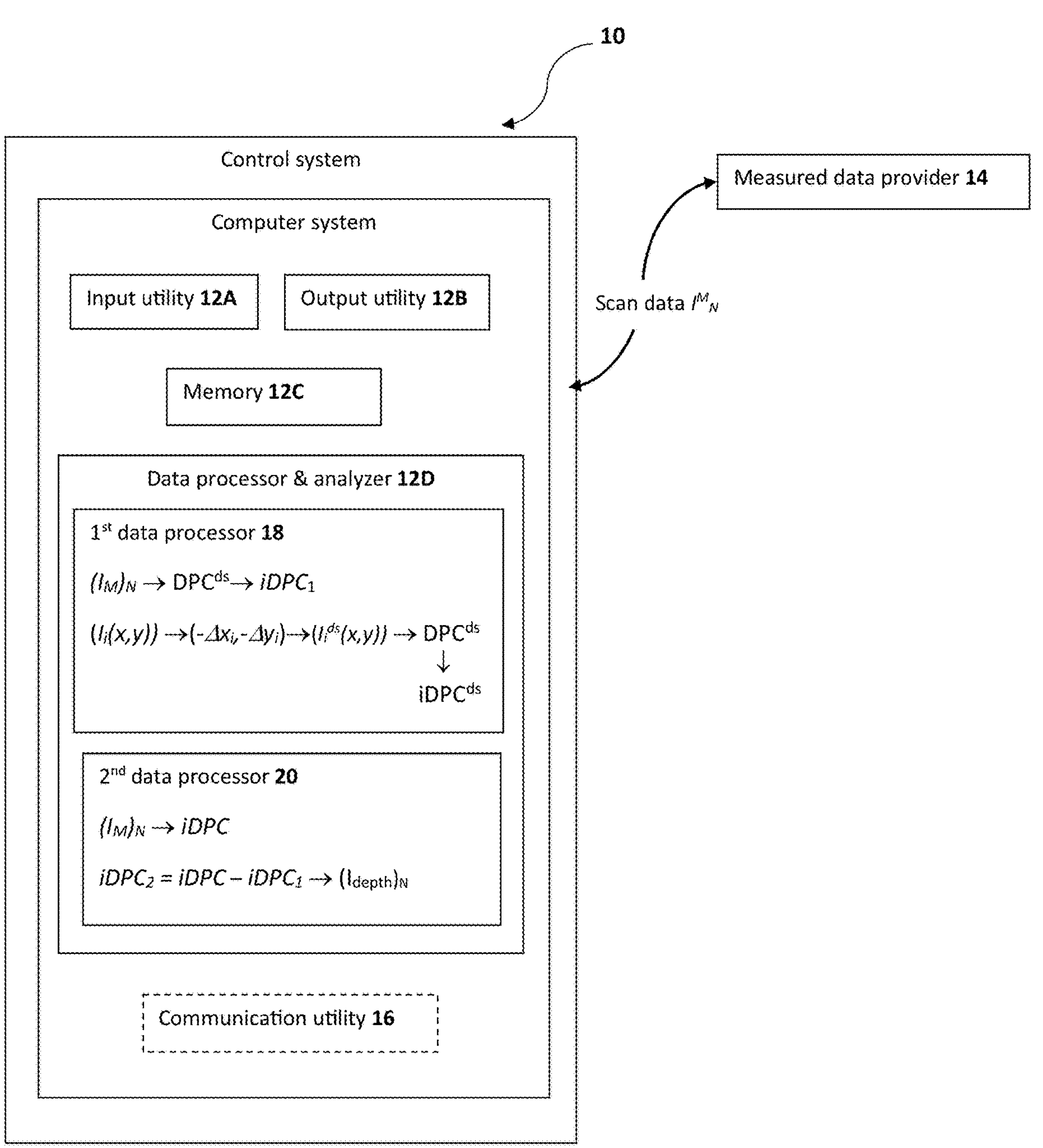
FIG. 1 is a block diagram schematically illustrating the configuration and operation of the data analysis system of the presently disclosed subject matter.

Referring to FIG. 1, there is schematically illustrated, by way of a block diagram, a data analysis system 10 of the presently disclosed subject matter for determining a structural image of a sample. The system 10 is typically a computer system comprising inter alia data input and output utilities 12A, 12B, memory 12C and a data processor and analyzer 12D. The system 10 is configured for data communication (via wires- or wireless-based technique of any known suitable type) with a measured data provider 14. To this end, the system may include an appropriate communication utility 16, which may be of any known suitable type.

The measured data provider 14 is typically a storage utility where the measured data is stored, and may be that of a scanning microscope itself or an external storage device associated with the scanning transmission microscope (electron microscope, optical microscope or X-ray microscope). The system 10 can thus be connected to/integral with a scanning microscope to process measured data being collected in real time (so-called on-line mode) or may be a stand-alone computer system receiving the measured data in off-line mode from the storage device.

The measured data that can be processed by the system 10 to provide a structural image of a sample is raw measured data obtained from a segmented detector collecting illumination transmitted through a sample during a single scan session in a scanning microscope. This may be electron beam scan session or optical scan session.

The raw measured data thus includes scan dataset, $(I_M)_N$; collected in a single scan and including a sequence of N measurements (e.g. measured points) on a sample (N≥9) obtained by an M-segment detector (M≥3). This scan dataset is processed and analyzed by the data processor and analyzer utility 12D. The data processor and analyzer utility 12D includes at least a first processor 18 which is configured and operable to process the scan dataset $(I_M)_N$ to produce data indicative of parallax corrected scan image data (structural image) of the sample, a so-called deshifted differential phase contract data $DPC^{ds}$.

Preferably this first processor 18 also calculates corresponding integrated differential phase contrast data $iDPC_1$. This enables separation between phase and depth information and direct extraction of depth contrast image of the sample in which the signed intensity, bright or dark, represents the degree of defocus. To this end, the data processor and analyzer preferably also includes a second processor 20, which utilizes data indicative of integrated differential phase contrast data iDPC (which is calculated from the scan data set by either the first or the second processor), and determines a difference, $iDPC_2$, between the iDPC and $iDPC_1$, which is indicative of the depth contrast image of the sample, in which the signed intensity, bright or dark, represents the degree of defocus indicative of the depth of features in the sample.

Thus, the data processor and analyzer 12D may be configured and operable to determine, in the scan dataset, two parts related to different contributions of the signal being detected: one part is associated with parallax component induced by phase delay of coherent illumination being detected by off-axis detector segments and is indicative of true phase contrast (determined by structure/composition of the sample), and the other part is associated with parallax component dependent on defocusing aberration effects.

Figure 2A:
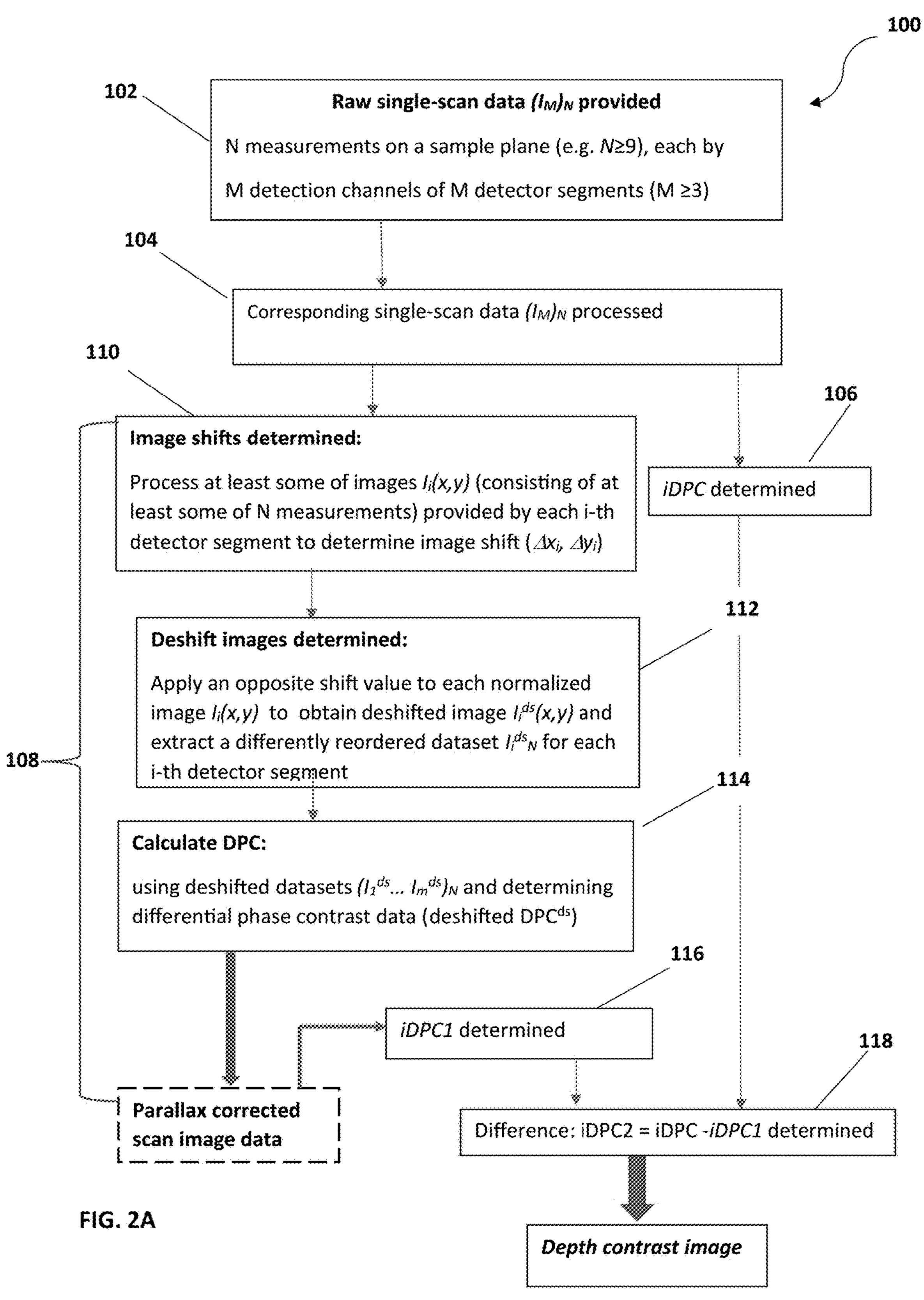
FIG. 2A exemplifies the flow diagram of the method of the presently disclosed subject matter that can be implemented by system of FIG. 1 to obtain parallax corrected scan image of the sample from the single-scan raw measured data, and how this parallax corrected image data can be used to extract depth contrast image.

More specifically, as indicated in FIG. 1, and is further exemplified in flow diagram 100 of FIG. 2A, the processor and analyzer 12D can operate to compensate, in the scan dataset, image shifts induced by off-axis detection channels for sample features at defocus plane to thereby separate between phase and depth contrast in the image data and directly extract a depth contrast image of the sample from the single scan dataset.

Such processing may be implemented as follows:

As indicated above, the scan dataset, $(I_M)_N$, is provided/received (step 102) including the sequence of N measurements/points on a sample each obtained by M detection channels of M-segment detector (M≥3). Each i-th detector segment provides image $I_i(x,y)$ based on the N measurement points along the scan, by mapping the locations in the image according to the locations of the focused beam exactly at the focal plane.

This scan dataset is processed (step 104) to determine the parallax-corrected scan image (stage 108). To this end, for at least some of N points in dataset $I_i(x,y)$ per each i-th-detection channel, an image shift $(\Delta x_i, \Delta y_i)$ is determined. This is a shift (e.g. a common shift for all N points acquired by the i-the detection channel) between the $(x,y)_{foc}$ locations of the focused beam at the focal plane and the $(x,y)_{defoc}$ locations of the beam on a sample at defocus plane, i.e. at a z location off the focal plane.

In other words, an image shift is found between $I_i(x,y)$ and a hypothetical image acquired from a central region of a detector at the optical axis defined by the illumination path of the microscope (step 108). The determination of the shift may for example be implemented as follows:

All possible vectors of relative image shifts are calculated for at least some of pairs ij of detection channels in at least some of the N measurements, i.e. intersegment cross-correlations between at least some of images $I_i(x,y)$ and $I_i(x,y)$ is performed and relative shifts $\Delta x_{ij}$ and $\Delta y_{ij}$ are calculated, and the image shift values $(\Delta x_i, \Delta y_i)$ are determined from a best fit condition (step 110). This will be described more specifically further below.

Then, an opposite shift value is applied to each normalized signal $I_i(x,y)$ to thereby obtain corresponding deshifted image $I_i^{ds}(x,y)$ with respect to each i-th detector segment/detection channel (step 112). The so-obtained deshifted scan dataset $(I_1^{ds}, \ldots I_M^{ds})$, where each set of N samples/measurements is now reordered/shifted differently, are used to calculate deshifted differential contrast data $DPC^{ds}$ (step 114). This deshifted differential phase contrast $(DPC^{ds})$ is indicative of parallax corrected scan image of the sample.

Preferably, this data $DPC^{ds}$ is used to calculate therefrom corresponding integrated differential phase contrast $(iDPC_1)$ (step 116) providing a parallax-corrected scan image related to the true phase of the sample (detected signal associated with radiation (light or electron beam) passage through the structure/composition of the sample) and being indicative of extended depth of field (as will be described more specifically further below).

Additionally, and in some embodiments preferably, the scan dataset $(I_M)_N$ is also processed to determine integrated differential phase contrast iDPC data (step 106). This enables to determine a difference, $iDPC_2$, between the integrated differential phase contrast data iDPC of the original scan dataset $(I_1, \ldots I_M)$, and integrated differential phase contrast data $iDPC_1$ of the deshifted scan dataset $(I_1^{ds}, \ldots I_M^{ds})$ (step 118), thereby enabling direct extraction of the parallax component of image dependent on defocus providing a simple and very interpretable 30 depth contrast.

Figure 2B:
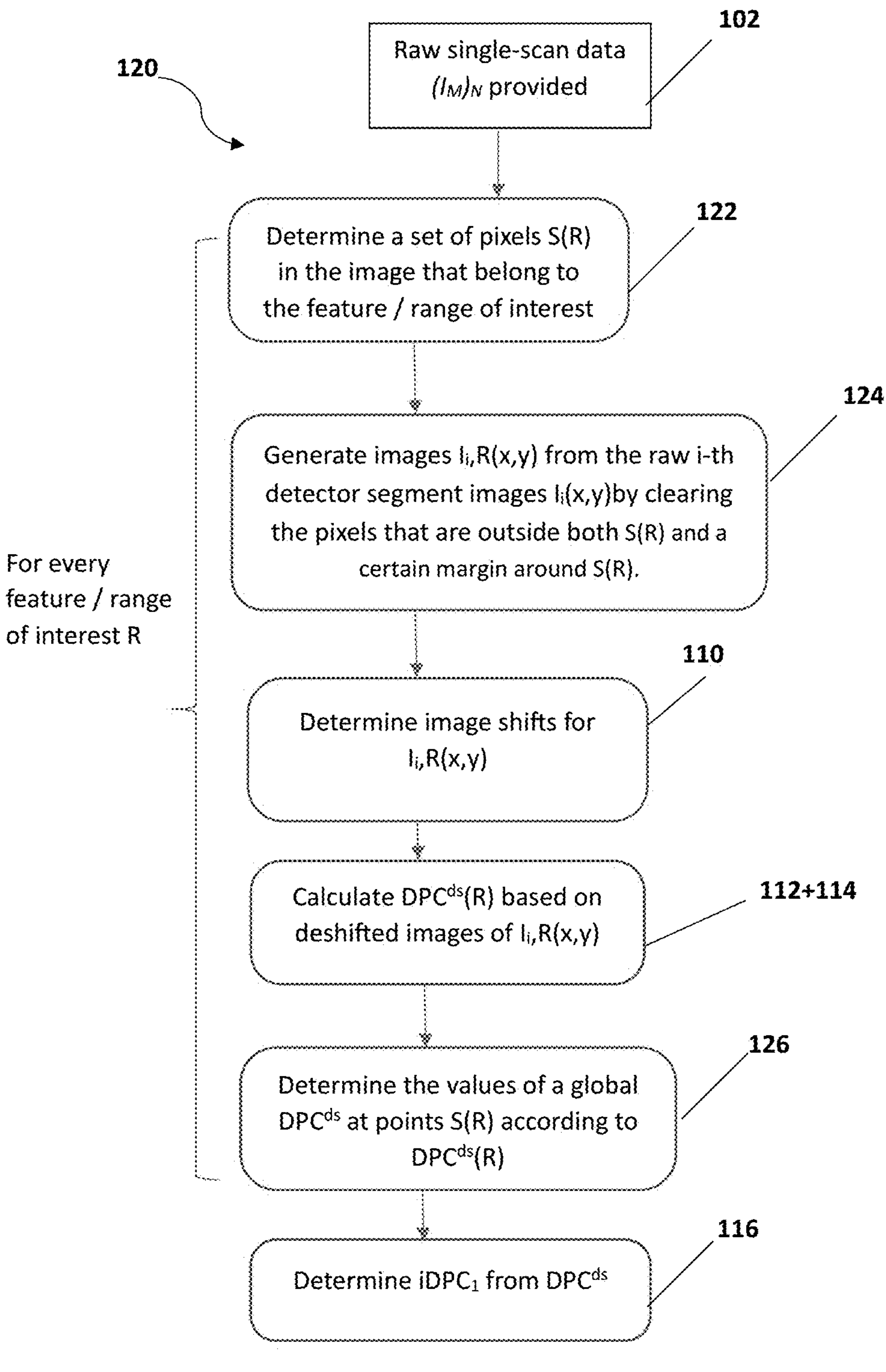
FIG. 2B shows a flow diagram of the method of the presently disclosed subject matter for determination of parallax corrected scan image of multiple objects in a sample.

The data indicative of parallax-corrected scan image may be so-called global parallax-corrected image data of multiple features/objects within a range of interest R. This technique is exemplified by a flow diagram 120 of FIG. 2B. To facilitate understanding, similar steps/elements in various examples of the presently disclosed subject matter as described herein are identified by the same reference numbers. As shown in the figure, raw single-scan data $(I_M)_N$ is provided (step 102) and, for every feature/range R of interest the following processing is performed: A set of pixels S(R) in the image is determined that belongs to the feature/range of interest R (step 122). Then, images $I_iR(x,y)$ are generated from the i-th detector segment images $I_i(x,y)$ by clearing pixels outside said set of pixels S(R)—step 124. Image shifts are determined for Ii,R(x,y), which is similar to step 110 described above; and these shifts are used to determine deshifted images and calculate corresponding deshifted $DPC^{ds}$ similar to the above-described steps 112 and 114. Then, values of global $DPC^{ds}$ are determined at points S(R) according to $DPC^{ds}$ (R) presenting the global parallax-corrected image data-(step 126). Similar to the above-described example, this data $DPC^{ds}$ is preferably used to calculate therefrom corresponding integrated differential phase contrast $(iDPC_1)$—step 116.

Figure 2C:
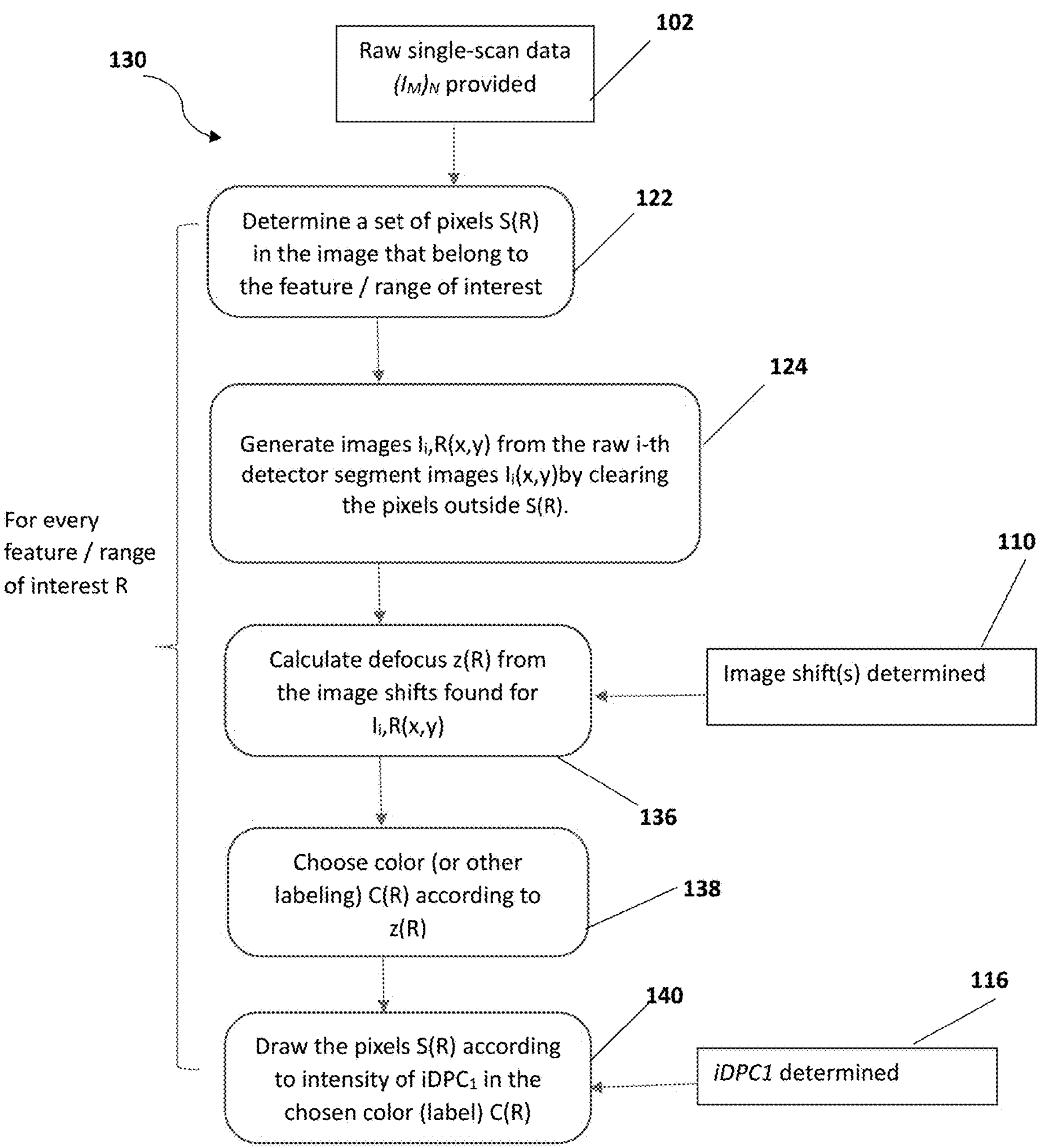
FIG. 2C exemplifies a flow diagram of the method of the presently disclosed subject matter for the formation of depth-labeled phase contrast image.

As indicated above, the technique of the presently disclosed subject matter also provides for obtaining a depth-labeled phase contrast image by displaying the $iDPC_1$ information with different labeling according to the depth of features in the sample, which is found from the scan dataset $(I_M)_N$. For example, the labeling can include color scale in a 2D image or recording the features in different slices of a 3D image file. In this connection, reference is made to FIG. 2C exemplifying a flow diagram 130 of this technique.

As shown, the raw single-scan data $(I_M)_N$ provided (step 102) and, for every feature/range R of interest the following processing is performed: a set of pixels S(R) in the image is determined that belongs to the feature/range of interest R (step 122); and, by clearing pixels outside said set of pixels S(R), images $I_i,R(x,y)$ are generated from the i-th detector segment images $I_i(x,y)$—step 124. Then the image shifts found in step 110 as described above are used to calculate defocus z(R), e.g. using model-based processing (step 136). Then, a color or any other suitable labeling mark C(R) can be chosen in accordance with the degree of defocus Z(R)—step 138; and the pixels S(R) are drawn according to intensity of $iDPC_1$ (determined in step 116 as described above) in the chosen color (label) C(R)—step 140.

The above-described data analysis technique can be used with electron beam scanning microscope or optical microscope or X-ray microscope by using any known suitable microscope configurations with the only modification that multiple detection channels are used (either by replacing a pixelated detector with a segmented detector or by proper interpretation of readout of the pixelated detector as described above) for detecting the illumination transmitted through the sample.

Considering optical microscopy, the principles of the presently disclosed subject matter may be implemented in confocal scanning microscope modified by using a segmented detector. biological samples, such as cells without stain, are mostly transparent to light. Specific features or molecules within may be fluorescent, whether naturally or by labeling with fluorescent proteins or chemical dyes. Generally, confocal microscope is designed to achieve contrast in such fluorescent samples and to scan inner layers with resolution on the order of a few micrometers in thickness. A scanning probe is focused by the microscope objective, which means that the illumination cone is defined by the numerical aperture of the objective. The scanned images are acquired by a detector collecting light returned along the illumination path. An aperture is used to improve the selectivity in depth by blocking out-of-focus light; the aperture is located at a plane confocal with the specimen focus. Fluorescence is selected from the returned light using spectral filters. Reflected light may also be used in cases of reflective specimens such as in metallurgy or mineralogy but is not adequate for biological specimens. Often, provision is made to also collect the transmitted light, though the transmitted image produced does not benefit from the depth-selecting aperture. To display the pattern of fluorophores within the context of the cell, there is a need for both the fluorescent (i.e., filtered reflection) scan and transmitted light scan. Since the typical specimens are transparent, very little contrast is obtained by the simple transmitted intensity. At the state of the art, contrast in the transmission scan can be achieved with polarizers and a Nomarski-modified Wollaston prism in the optical path, which implements a Differential Interference Contrast (DIC) technique.

FIGS. 3A-B exemplify images that can be obtained using the state of the art confocal scanning microscope, where FIG. 3A shows image resulting from simple light collection and FIG. 3B shows the image after DIC filtering. In this specific example, transmission scans of fibroblast tissue culture cells in Olympus Fluoview scanner with BX50WI microscope, where the DIC components are withdrawn or inserted, which shows the benefit of DIC filtration clearly. However, the image position and shading depend on settings of the polarizers and the prism, so positioning of the fluorophore distribution in the cell context is compromised. Moreover, the complexity in adjusting several optical components conflicts with other optical manipulations.

To implement the technique of the presently disclosed subject matter, the confocal scanning microscope is modified by using a segmented detector, e.g. quadrant detector, placed in a diffraction (Fourier) plane of the scanning probe of a confocal microscope.

Figure 4B:
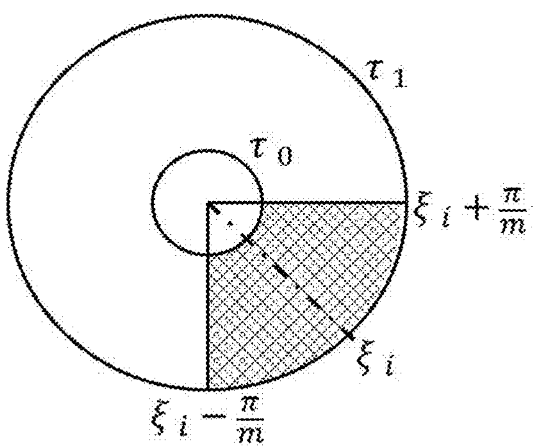

In this connection, reference is made to FIGS. 4A and 4B. FIG. 4A shows the general principles of the light detection scheme in a confocal scanning microscope 200 and how it can be used for the purposes of the presently disclosed subject matter. As shown in the figure, an illumination cone is structured such that it is focused to probe a focal plane, and a quadrant detector 202 having segment A, B, C, and D is located in the diffraction plane. The use of segmented detector allows measurement of Differential Phase Contrast (DPC) and its derived integrated Differential Phase Contrast (iDPC) as follows:

$$DPC_x \propto I_A + I_B - I_C - I_D$$

$$DPC_y \propto -I_A + I_B + I_C - I_D$$

$$iDPC_{(x,y)} = \int_0^x dx DPC_x + \int_0^y dy DPC_y$$

The DPC and iDPC are derived from normalized current $I^i$ received by each i-th detector segment simultaneously from segments A-D, which current is proportional to the collected illumination falling on the area of said segment.

The detected signals correspond to a point in a full scanned image, $I_i(x,y)$ by the i-th detector segment, so the indices (x,y) correspond to the location of the scanning probe (namely the focal point of the illumination) on the sample. The x and y components of DPC are with respect to the diffraction plane (Fourier plane) where the detector is located, so in the special case that the beam is curled (similar to curling of the scattering trajectory of electron in magnetic field) a corresponding vector is to be transformed to the (x,y) framework of the scan (otherwise, the two frameworks are the same). In any case, the DPC corresponds to element-wise mathematical operations between datasets/images $I_i \ldots I_M$.

As mentioned above and will be described in more details below, the measured data analysis technique of the presently disclosed subject matter utilizes separation of the DPC and iDPC into two parts related to different contributions in the signal being detected. One part is the true phase contrast related to delay in phase of the coherent illumination by the sample, and the other part is referred to as depth contrast, which involves the influence of defocus aberrations. According to this technique, the true phase contrast ($iDPC_1$ in FIG. 2) is calculated from "deshifted" scan images of the signal $I_i(x,y)$ detected by each i-th detector segment along the scan, namely from corrected images based on finding the image shifts ($\Delta x_i$, $\Delta y_i$) and translating each image by the opposite shift. Effectively, this means that the scan signals $I_i(x,y)$ are synchronized with the true point of (x,y) on a sample.

The inventors have found that the computationally aligned or "deshifted" $iDPC_1$ is robust against lens aberration and remains much the same when the image is scanned at a range of lens defocii as large or even somewhat larger than the canonical depth of field.

The second contribution of iDPC is determined as $$iDPC - iDPC1 = iDPC2$$

where the image intensity of iDPC2 is sensitive to the depth of the sample's features, and thus it reveals the order of the features in height based on differences in brightness of similar features.

There is a certain freedom in determining the zero of iDPC2, which represent the background. For presentation of iDPC2 as depth contrast, the iDPC1 is calculated from image shift larger than about 1 pixel, otherwise the details cannot be observed. The range of interest (ROI) in the iDPC1 calculation for this purpose is preferably in the margins of the image, where the contrast may disappear. If the image shift is less than 1 pixel, the value of 1 pixel can be used for deshifting of the images.

The technique of the presently disclosed subject matter thus advantageously provides for acquiring 3D information of the sample (i.e. structural data of the sample) in a single scan.

In the following, the general relation between defocus and image shifts with the use of M-segment detector (M≥3) located in a diffraction plane (Fourier plane) is explained.

By selecting part of the image around a chosen feature the amount of defocus (lens correction) required to scan the feature in focus can be determined. It is possible also to select the entire scan image and determine the best defocus required to bring the entire scan to best average focus, from which relative heights or depths appear as relatively bright or dark intensities.

FIG. 4B shows the specification of the elements in the detector (shaded area) and an outer circle that can be determined by the cone of illumination, $\tau_1$ denoting the semi-angle of the cone. Angles $\tau_0$ and $\tau_1$ are arctangent of the radii of collected illumination divided by the imaging length in the electron microscope, and in optical systems $\tau_1$ is simply the numerical aperture. Unless there is a hole in the center of the detector, the inner angle is $\tau_0=0$. The outer angle is the smaller between the beam illumination cone angle and the detector maximum collection angle.

The azimuthal angle of the center of each i-th detector segment is $$\xi_i = \frac{2\pi}{M}(i-1) + \phi$$

with respect to a certain x-axis in a Cartesian coordinate system. A scan image is acquired from each detector segment, which due to its specified location is shifted by $(\Delta x_i, \Delta y_i)$ compared with a scan image that would be acquired from a central element/segment in the detector lying on the optical axis defined by the illumination path.

In general, the lenses may introduce aberrations. The inventors have determined the relation between the image shift of i-th detector segment, the defocus Δz, and the dominant aberrations according to a set of linear equations as follows:

$$\begin{pmatrix} \Delta x_i \\ \Delta y_i \end{pmatrix} = \kappa \begin{pmatrix} \cos(\xi_i) & 0 & \sin(\xi_i) \\ 0 & \sin(\xi_i) & \cos(\xi_i) \end{pmatrix} \begin{pmatrix} \Delta z + A_{1x} \\ \Delta z - A_{1x} \\ A_{1y} \end{pmatrix} + C_3 \Omega \begin{pmatrix} \cos(\xi_i) \\ \sin(\xi_i) \end{pmatrix},$$

where $$\kappa \equiv \frac{2}{3}\frac{(\tau_1^3 - \tau_0^3)}{(\tau_1^2 - \tau_0^2)}\frac{\sin(\pi/M)}{\pi/M}$$

$$\Omega \equiv \frac{2}{5}\frac{(\tau_1^5 - \tau_0^5)}{(\tau_1^2 - \tau_0^2)}\frac{\sin(\pi/M)}{\pi/M}$$

Here, $(A_{1x}+iA_{1y})$ is the 2-fold astigmatism, and $C_3$ is the spherical aberration.

Since there are different equations for each i-th detector segment, the defocus Δz and aberration constants can be extracted by solving for them when the image shifts are known. Often it is possible to neglect all aberrations except for defocus, and a four-quadrant detector aligned as $$\xi_i = \frac{\pi}{2}(i-1) - \frac{\pi}{4},$$

i=1 . . . 4 can be used, similarly to the quadrants in a Cartesian coordinate system. In this case the calculation simplifies to:

$$\begin{pmatrix} \Delta x_1 \\ \Delta y_1 \end{pmatrix} = \frac{4\tau_1}{3\pi}\Delta z\begin{pmatrix} 1 \\ -1 \end{pmatrix}, \begin{pmatrix} \Delta x_2 \\ \Delta y_2 \end{pmatrix} = \frac{4\tau_1}{3\pi}\Delta z\begin{pmatrix} 1 \\ 1 \end{pmatrix}, \begin{pmatrix} \Delta x_3 \\ \Delta y_3 \end{pmatrix} = \frac{4\tau_1}{3\pi}\Delta z\begin{pmatrix} -1 \\ 1 \end{pmatrix}, \begin{pmatrix} \Delta x_4 \\ \Delta y_4 \end{pmatrix} = \frac{4\tau_1}{3\pi}\Delta z\begin{pmatrix} -1 \\ -1 \end{pmatrix}$$

In practice, the defocus Δz is obtained by averaging all shift results according to:

$$\Delta z = \frac{3\pi}{32\tau_1}(\Delta x_1 - \Delta y_1 + \Delta x_2 + \Delta y_2 - \Delta x_3 + \Delta y_3 - \Delta x_4 - \Delta y_4)$$

Image shifts are usually obtained via digital analysis by finding the location of the highest peak in a correlation map between two images. However, the reference "unshifted" scan (from a central detector element) can be omitted and the required image shifts are extracted more reliably from all possible couples among the shifted M images. The procedure is demonstrated for the case M=4 as follows.

The unknown image shifts in relation to a virtual "unshifted" image are denoted by shift vectors $r_1$, $r_2$, $r_3$, $r_4$ ($r_i=(\Delta x_i, \Delta y_i)$). The relative shift of image q with respect to image p is denoted $r_{pq}$, and is related to the required vectors as $r_{pq}=r_q-r_p$. Since $r_{pq}=-r_{qp}$ it suffices to measure cross correlation of 6 image pairs, and the following equations are used:

$$3r_1 - r_2 - r_3 - r_4 = r_{21} + r_{31} + r_{41}$$

$$3r_2 - r_1 - r_3 - r_4 = r_{12} + r_{32} + r_{42}$$

$$3r_3 - r_1 - r_2 - r_4 = r_{13} + r_{23} + r_{43}$$

$$3r_4 - r_1 - r_2 - r_3 = r_{14} + r_{24} + r_{34}$$

After rewriting the equations using the known $(\Delta x_{pq}, \Delta y_{pq})$ one can solve for the required $r_i=(\Delta x_i, \Delta y_i)$ using known in the art Moore-Penrose pseudoinverse solution.

It should be noted that $r_{pq}$ can be found in subpixel resolution as follows. 16×16 points around the highest peak in the cross-correlation map are first isolated, then interpolated to 512×512 points (for example using the Matlab code fftInterpolate written by Matthias Christian Schabel). The location of the peak is then found within 1/32 pixel resolution.

Since Δz is determined by a linear relation to a measurable property (the image shifts) the performance of existing algorithms that determine defocus based on image blurring can be exceeded by the technique of the presently disclosed subject matter, since the property of blurring depends quadratically on defocus and is thus less accurate to determine small defocus.

The technique of the presently disclosed subject matter is exemplified for a quadrant detector replacing a bundle of optical fibers in the back of the BX50WI microscope; the fiber bundle normally carries transmitted light to a photomultiplier detector. The quadrant photodiode detector (UDT, SPDT 40) is rectangular, with total size of 7 mm. The active surface of the detector is placed at the location to which the diffraction plane of the condenser is projected, normally where the edge of the fiber bundle is otherwise positioned in the BX50WI. The precise location of the diffraction plane is found using a Bertrand lens replacing one of the eyepieces, in which the light emitting fiber bundle should appear in focus. The position of the collimator is then aligned by viewing the edges of the field iris via the normal eyepiece. By partly contracting the field iris and bringing its edges to focus it is assured that the diffraction pattern of the sample is projected on the chosen plane of the detector.

For demonstration, the 4 wires and the ground pin of the quadrant detector are connected to a 4-channel oscilloscope (Siglent SDS 1104x). The labeling of the channels should follow the order shown in FIG. 4A so the DPC calculation can apply. The acquisition settings are 250 KS/s, 2 sec/div, for a scan time of 28 sec. The sensitivity is either 10 mV/div with AC coupling or 100 mV/div with DC coupling, where in transparent cells the former is needed for sufficient resolution of details. The scan is controlled from the Fluoview software and set to 35.9 sec and 2048×2048 pixels, using zoom 2 and objective lens of X20 NA=0.7, so the pixel size is 0.17 microns. The data are stored in CSV file and analyzed by a custom-written MATLAB code to produce the images.

The cells are fixated on a slide and a green laser probe is focused on the cells with the normal objective focus. The collimator is then readjusted so the fins of the field iris viewed through the eyepiece is at focus. This step assures that the quadrant detector is at the diffraction plane. The signals are acquired with the laser scan and using a custom-written Matlab code "confocal_measure.m" the image shift is calculated either over the entire scan area or around a feature of interest. Based on the image shift the defocus is determined according to $$\Delta_Z = \frac{3\pi}{4NA}\langle[\text{image shift}]\rangle\,[\text{pixel size}]$$

One of the scans at arbitrary sample position "z=0" provided the following image shifts:

i=1, (8.0859, −7.1797)

i=2, (7.0078, 6.1797)

i=3, (−7.1953, 7.6328)

i=4, (−7.8984, −6.6328)

Image shift average=7.2 pixels

Reference is made to FIGS. 5A-5D showing the results of experiments conducted by the inventors, comparing the technique of the presently disclosed subject matter to the DIC filteration method.

The iDPC image data (FIG. 5A) can be calculated from the raw measured data as described above with reference to FIG. 4A. The deshifted iDPC (iDPC1 in FIGS. 1 and 2) is calculated (using custom-written Matlab code confocalb.m) from the images after applying the following translation vectors, which cancel the average shift $$i = 1,\ (-7.2,\ 7.2)$$
$$i = 2,\ (-7.2,\ -7.2)$$
$$i = 3,\ (7.2,\ -7.2)$$
$$i = 4,\ (7.2,\ 7.2)$$

Figures 5A, 5B, 5C, 5D:
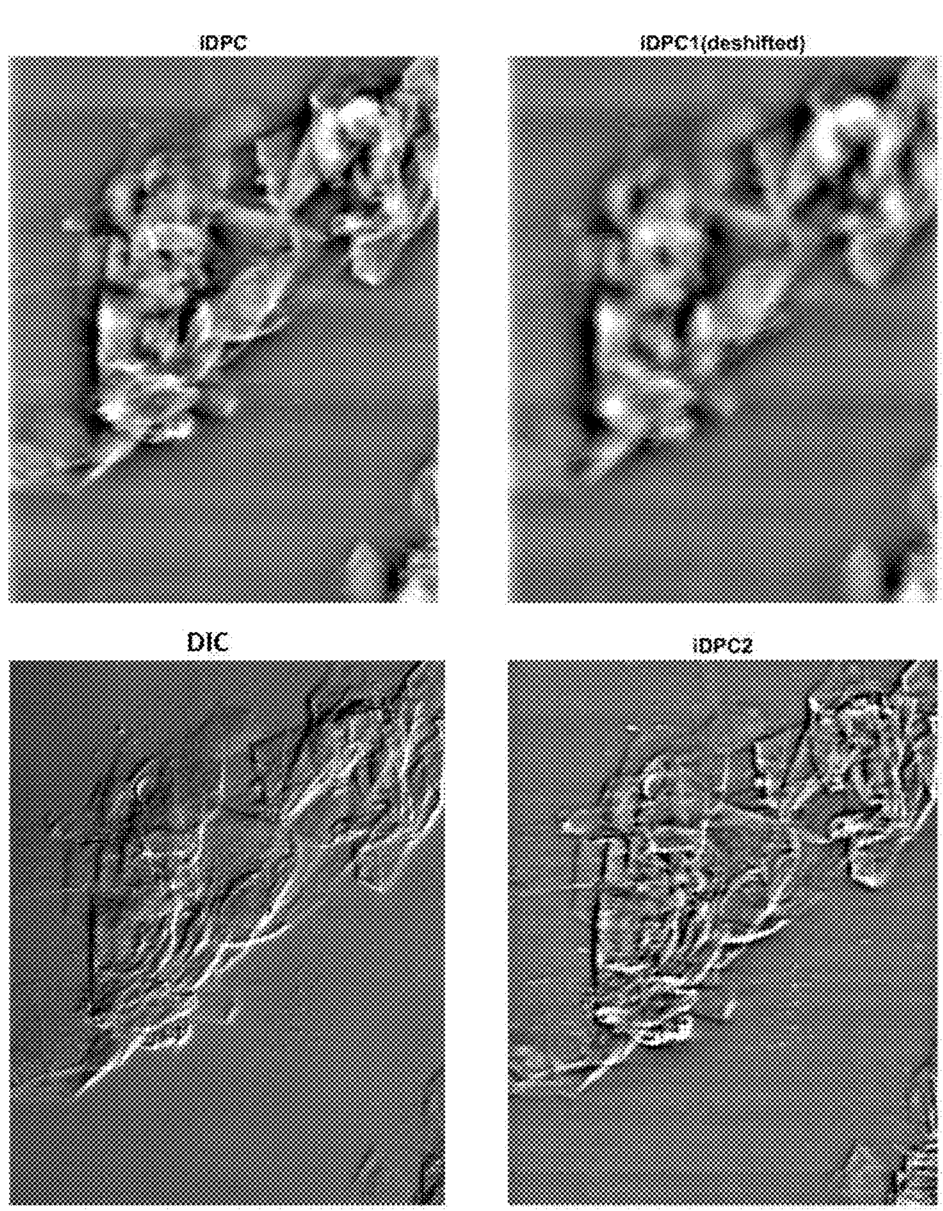

The deshifted iDPC in FIG. 5B seems to deshift one of the layers that was out of focus but do injustice to another layer that was originally at the correct position. However, the subtraction iDPC2=iDPC−iDPC1 that is shown in FIG. 5C reveals a clear image of the cells, which resembles the DIC filtered image (FIG. 5D) discussed above. It should also be understood that the technique of the presently disclosed subject matter can be used without introducing any new optical components to the microscope system.

FIG. 6 illustrates a plot of the image shifts obtained at several defocus points (the sample is moved in relation to the objective lens). The plot is found linear, which confirms the modeled theoretical relation between defocus and average image shift. From the slope of the plot, it is found that the numerical aperture is to be NA=(3π*0.17/4)/0.809=0.5, somewhat smaller than the NA=0.7 of the objective.

It should be noted that several technical improvements can be used in the measurements to impact both the convenience and quality of the data, such as the use of a proper amplifier for the photodiode, a dedicated signal acquisition device synchronized to the scan, and an optical switch between conventional trans-illumination and use of the segmented detector in the scanning mode.

As mentioned above, the data analysis technique of the presently disclosed subject matter can be used with scanning transmission electron microscope (STEM) of any known suitable microscope configuration utilizing a segmented detector for detecting sample's response to electron beam illumination.

Generally, STEM is based on instantaneous measurements of electron flux as the specimen is illuminated by a focused probe. A variety of detectors may be employed, singly or simultaneously, which subtend different solid angles of scattering. These may be configured such that their signals are dominated by distinct scattering processes. Thus, a detector with multiple segments can report on coherent and incoherent scattering, or distinguish light from heavy elements, on the basis of comparative signal intensities [1].

Simultaneous acquisition of integrating area detectors such as ring shapes is needed for Annular Dark Field (ADF) and off-axis elements for Differential Phase Contrast (DPC). Computational methods such as integrated DPC (iDPC) offer a powerful extension in that the image contrast need not be a simple representation of an analog signal from the detector.

For wide-field TEM, the notion of the image as a 2D array of square pixels is inherent in the camera architecture. By convention, the STEM image is generated by scanning the probe in a raster pattern and synchronizing the detection window to define pixels in rows and columns, normally with an aspect ratio of one. While this 2D array is retained as a convenience for presentation and storage in a standard file format, in fact the raw signals are traces in time. Separating the measurement sampling from the image pixel leads to considerable freedom in generation of unconventional scan patterns and in measures for minimization of damage to radiation-sensitive specimens. Unconventional scans have been explored recently in the context of compressive sensing acquisition, which could potentially offer an improvement in dose efficiency and scan time.

The inventors have also developed scan and data acquisition control system for a STEM utilizing multi-channel detection based on use of multi-segment detector. This technique provides simultaneous multi-channel (e.g. eight-channel) acquisition (with practically no limitation to the number of channels defined by detector segments) and arbitrary waveform scanning capability.

Figure 7C:
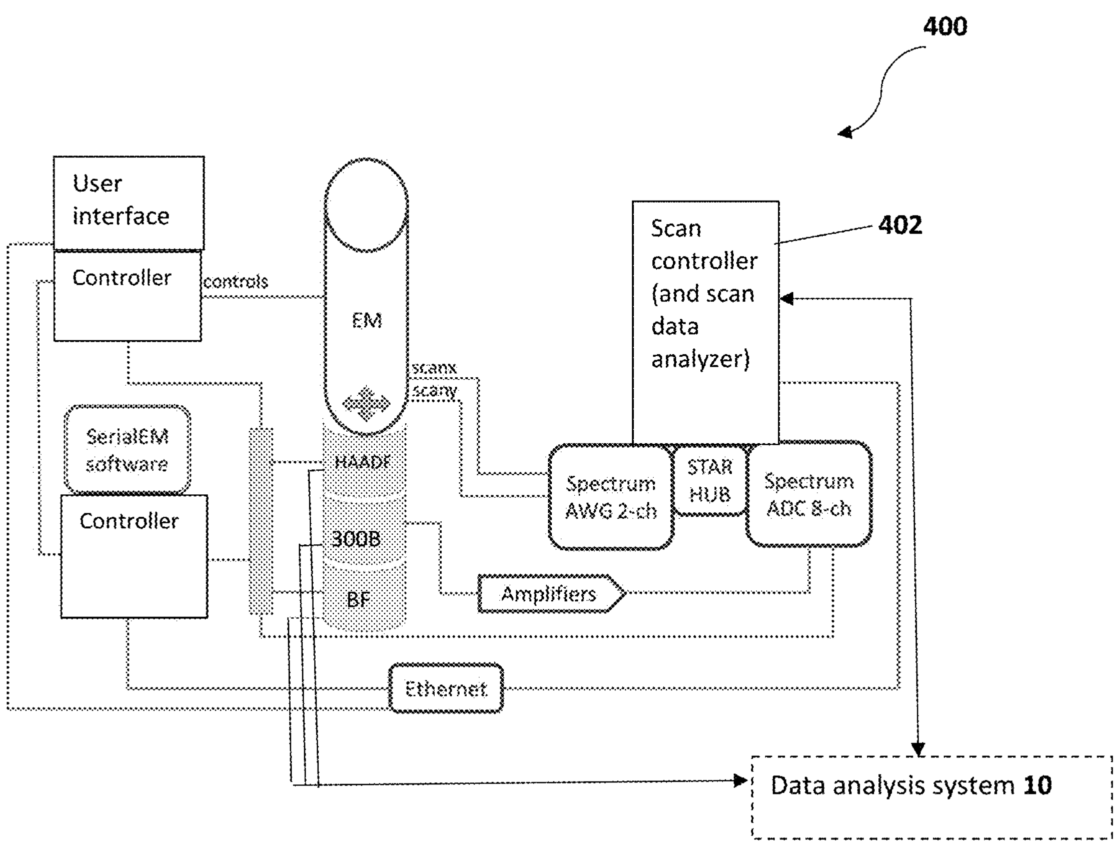
FIG. 7C shows, by way of a block diagram, an exemplary STEM configuration incorporating the presently disclosed subject matter.

In this connection reference is made to FIGS. 7A-7C, wherein FIGS. 7A and 7B exemplify multi-segment detectors 300A and 300B, respectively, and FIG. 7C exemplifies, by way of a block diagram, a STEM 400 equipped with the scan and data acquisition control system 402.

As shown in FIG. 7A, the detector 300A includes the following segments providing corresponding detection channels: four-quadrant detector segments A,B,C,D, and outer annular ring segments E, F and an additional detector BF being a bright field detector or EELS spectrometer located within a central region of the disc 302. In the example of FIG. 7B, the detector 300B is configured generally similar to that of 300A, namely including detector segments A-F, but having no central detector leaving a central hole/aperture. This allows for placing additional detector BF downstream of the disc 302 while being vertically aligned with the central aperture of the disc.

The detector of FIG. 7B may be implemented similar to solid-state segmented detector commercially available from Opal, El-Mul Technologies, Israel. This figure also shows montage of such 6 detection channels acquired in a real-space scan providing uniformity of detector response.

As shown schematically in FIG. 7C, the STEM 400 is of the generally known configuration (e.g. FEI Tecnai T20-F), namely includes an electron beam column EM configured for implementing a scan mode along x- and y-axes while being properly controlled by user input via user interface and typical serial software. In this system, however, a detection unit is configured to implement eight-channel detection, and an internal scan generator is modified to implement scan mode control according to the presently disclosed subject matter and possibly also the scan dataset analysis as described above. Alternatively (or additionally), as shown in the figure in dashed lines, the scan dataset analyzer 10 may be part of an external system in data communication with the STEM. The detection unit includes the above-exemplified 6-segment detector 300B, a bright field detector BF located downstream of and aligned with the central hole of the detector 300B, and a high-angle annular dark-field detector HAADF accommodated upstream of or surrounding the detector 300B, providing all together 8 detection channels. As also shown in the figure, the scan controller operates to control arbitrary waveform generators (AWGs) to perform x- and y-axes scan, and read out circuit including analog to digital converters (ADCs) for converting electrical output of 8 detection channels. Acquisition hardware is built from off-the-shelf components. The software is organized so that the system appears as a camera to the popular microscope control platform SerialEM, facilitating integration into sophisticated protocols such as automated acquisition or tomography.

The use of the above-described data analysis technique of the presently disclosed subject matter for analysis of signals acquired by multiple detection channels associated with multiple segments of the detector demonstrates that additive terms in the contrast transfer function for iDPC-STEM or for iDPC optical microscope reflect material contrast related directly to phase, and a parallax component dependent on defocus. The latter provides a simple and very interpretable depth contrast. Compensation for the parallax shift provides an extended depth of field and suppresses contrast inversion in the phase image.

The various image modalities are demonstrated in the following using a non-planar network of boron nitride nanotubes.

Generally, the four design features that are to be considered for a flexible scan system include the following: scan patterns, synchronous multi-channel acquisition, software integration, and data structure.

With regards to the scan patterns, the following should be noted: The raster scan is the most natural way to fill a Cartesian plane, with a fast scan in one direction and a slow step in the other. The raster scan also corresponds conveniently to storage of data arrays in a computer by row and column. One should typically only synchronize the sampling to generate a 2D image similar to the read-out of a camera. The raster scan is not, however, a natural way to steer an electron beam. Both the magnetic deflectors and the electronic amplifiers that drive them have a minimal response time, which means that the actual beam location lags behind the control signal that determines the recorded pixel position. At the end of each line the beam is to come rapidly to a halt and reverse direction. This causes very strong scan distortions near the edges of the frame, where severe damage often accumulates. The displayed field is normally cropped to a smaller region where the scan is properly linear. A significant fraction might have to be discarded, and the displayed area might also shift horizontally depending on the scan speed.

A more natural way to scan would be to minimize changes in the probe acceleration. For example, a circular scan is entirely smooth, with sine and cosine functions driving orthogonal directions. Then, the probe lag is equivalent to a phase delay on both. By slowly reducing the amplitude, a shrinking spiral is obtained or set of concentric circles. A variety of spiral scan schemes has been explored previously [8]. Alternatively, the plane may be covered by sweeping a large circle slowly along a line. The Hilbert pattern is another attractive scanning option to reduce distortion by shortening the flyback paths [9].

Maximal flexibility can be achieved by preparing an array of scan coordinates in advance. The Cartesian pixel grid can be recovered by interpolation between the sampled points taking the phase delay into account.

With regards to synchronous multi-channel acquisition the following should be noted: In order to improve quantitative comparison between measurements in different channels the acquisitions are to be truly simultaneous. Many digitizers multiplex the measurements in time to use a single analog to digital converter. This approach can cause aliasing artifacts when sampling close to the clock speed, and moreover it is hard to increase the number of channels without slowing the acquisition proportionally. Therefore, simultaneous acquisition is desired. It is also desirable to sample at a frequency significantly higher than the temporal response of the detector amplifiers. This is useful for noise reduction by averaging and for optimal interpolation of non-Cartesian scans.

Proper software integration might also be needed because a data collection session for automated operations, such as through-focus series, tomography and recordings for single particle analysis, requires a level of meta-control beyond that of the single image recording. The commonly used SerialEM package can be implemented in a scan generator in order to leverage its capabilities for navigation, acquisition, and microscope control. It should be understood that integration with other software is also possible.

Requirements of the file format for saving multi-channel images with flexible scan patterns may include efficient data compression, flexibility and tractability of the field definitions, and aggregation of multiple scans in tomography. Metadata can be saved in the same file. A current mature technology that fulfils the requirements is the MAT file by Mathworks, which can be loaded directly to MATLAB or processed with available open source libraries based on the published format. For example the popular MRC format [20].

The hardware used in the experiments conducted by the inventors to demonstrate the techniques of the presently disclosed subject matter is based on computer cards from Spectrum Instruments GmbH (Germany): a two-channel arbitrary waveform generator (AWG) M2p.6541-x4, an eight-channel 16-bit analog to digital converter (ADC) M2p.5923-x4, and a STAR-HUB that synchronizes the cards. The AWG outputs are attached to the "Line" and "Frame" external scan inputs (scanX and scanY, henceforth) for STEM. External terminators of 75 Ohm are added at the high impedance microscope inputs. The scanning process begins with upload of pattern vectors for the scanX and scanY inputs of the microscope to the on-board memory of the AWG card. Sampling rates, duration, and amplitude are set to determine the field of view and resolution, including margins that will not be part of the image. Then a synchronized generation and acquisition is handled by the STAR-HUB. Finally, the acquired records are downloaded to the storage utility. The internal storage is sufficient for 8 channel scans of 2048×2048 pixels with oversampling and scan margins, but in principle a first-in-first-out (FIFO) mode could utilize the computer RAM to expand the sizes.

Figure 8:
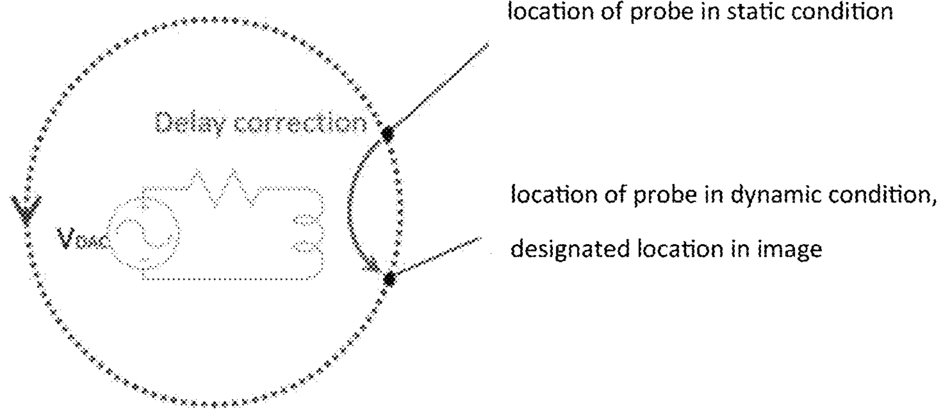
FIG. 8 exemplifies a protocol that can be used in a microscope to compensate for distortions in the scan due to inductive scan delays.

The scan might require distortion compensation due to inductive scan delays. The lumped circuit expected for the beam deflectors is a resistor and inductor in series (as shown schematically in FIG. 8). The location of the beam is determined by the magnetic field and thus by the current passing through the inductor L in the scan coil. The commanded location of the beam is determined by the voltage generated by the Arbitrary Waveform Generators (AWG) channels divided by a constant resistance of the resistor R. The delay of the current after the voltage has a characteristic time $\tau=L/R$, and therefore the actual position, lags behind the command signal. A list of digital-to-analog conversion (DAC) vectors hold the target points (scanXi, scan Yi) to feed the scan coils, which correspond to the location of the beam in static condition. The sample locations (xi, yi) in the reconstructed image correspond to the location of the beam in dynamic condition, determined by the current in the magnetic coil that lags behind the DAC signal.

The delay can be compensated by adjusting the position key used to reconstruct the image. The relation between the commanded location X (or Y) and the actual location Xcorr (or Ycorr) is determined by the first order differential equation $$X_{corr} = X - \tau\frac{dX_{corr}}{dt}$$

In discrete form the equation reduces to a corrected series at scan positions n>1:

$$X_{corr}[n] = \left\{X[n] + \frac{\tau}{\Delta t}X_{corr}[n-1]\right\} / \left(\frac{\tau}{\Delta t} + 1\right)$$

The delay constant fitted to the microscope (FEI, Tecnai T20-F) was found to be approximately 200 μs. Comparing different scan amplitudes and times, the inventors identified a second order correction as a dependence of τ on the scan velocity. By analyzing images of a replica grating it turned out that $\tau_x$ and $\tau_y$ are to be tuned independently to remove kinks in vertical and horizontal lines, respectively.

In summary, $$\tau_x = A1 * [1 - B1 * (\text{scanx\_amplitude}/\mathit{fullXsize})/\Delta t]$$

-continued $$\tau_y = A2 * [1 - B2 * (\text{scany\_amplitude}/\mathit{fullYsize})/\Delta t]$$

In the tests performed by the inventors, the fitted values were A1=220 μs, A2-265 μs, B1=B2=0.1 μs/mV. It should, however, be understood that different instruments might require slightly different corrections.

The scan might require resampling to 2D image, which may be implemented as follows: The raw data series is converted to a 2D image in Cartesian coordinates for processing and presentation. This involves, first, a correction for the time delay as discussed above. Non-raster scans are interpolated to the Cartesian grid of image pixels. Due to over-sampling, the raw data may be denser than the target array. At acquisition, the over-sampling factor can be set by default to e.g. 10, and is to be reduced if the recorded size or sampling rate exceeds hardware limitations of 512 GS/20 MS/s. Interpolation is based on an average of nearby (<1 pixel) sampled values around the filled pixel, weighted according to distance to sampled positions, i.e.

$$I(x, y) = \sum w_i S_i(x_i, y_i) / \sum w_i.$$

Here, bilinear weighting factor is used calculated as $$w_i = (1 - |x - x_i|)(1 - |y - y_i|),$$

according to the distance (in units of pixels) between the exact beam position and the center of the pixel. Bicubic or other weightings may be implemented as well.

It should be noted that in contrast to compressive sensing acquisition, the technique used in the presently disclosed subject matter is over-sampling the equivalent pixel grid. This comes at no cost in exposure because, lacking a fast blanker, the beam is in any case sweeping across the sample, and the analog-to-digital conversion (ADC) bandwidth is higher than that of the detector response. The over-sampling provides a measure of redundancy and noise reduction in comparison with instantaneous sampling coupled directly to a pixel lattice.

In order to validate the scan used in the experiments, a standard replica grating (S106, Agar Scientific, with 2160 lines/mm) was used to develop several scan patterns.

It should be noted that the technique of the presently disclosed subject matter is not limited to the type of the scan used in measurements (e.g. raster scan, circular scan, spiral scan, etc.). Generally, for the measured data analysis, what is to be known (properly supplied) is data indicative of the arrangement of the detector segments to enable properly identify and process data pieces associated with different detection channels.

Figure 9A:
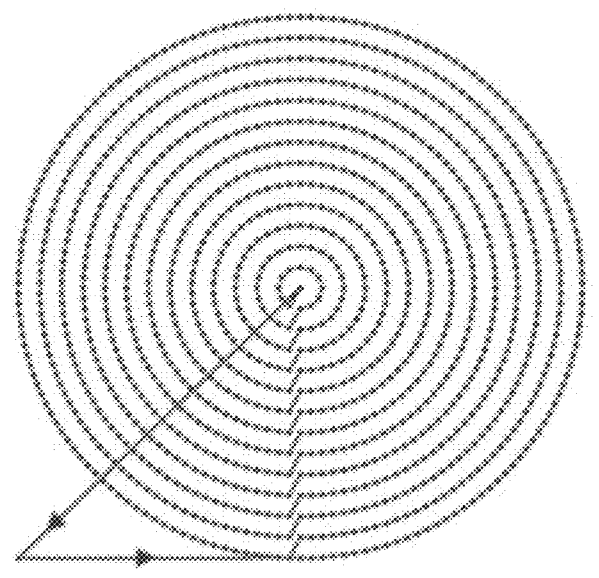

FIG. 9A exemplifies a pattern of the sequence of scan points, i.e. a pseudo-spiral scan consisting of a series of concentric circles with radius decreasing in steps of one pixel, starting from the circle circumscribing the requested square image. The fraction of the scanned area retained is then 2/π. In many applications, such as imaging of abundant particles, a square image might not be required, so the entire scan area may be used. The number of sampled points (x, y) is equal to the circumference of the circle times an over-sampling factor samples_per_pixel, which is provided for noise reduction as above. The speed of the beam travel is constant and smooth except for the jumps over one pixel between the circles at a certain angle.

FIG. 9B exemplify uncorrected full span of a 10 s scan, i.e. the spiral scan with full circular margins circumscribing a square image. The uncorrected artifacts include a twist at the center of the scan and displacement of the lines that should appear straight. FIGS. 9C and 9D show two examples of correction for central region of a 10 s scan (FIG. 9C) and correction for central region of a 5 sec frame times (FIG. 9D) according to the inductive model described above with reference to FIG. 8. A remnant distortion remains in the faster scan, which may be corrected with higher order time derivatives. At the end of the scan the beam is deflected to one of the corners outside the image frame.

Scan dataset from each detection channel associated with the detector segment (e.g. of the detector exemplified in FIG. 7A or 7B) can be stored separately, producing multiple images, yet the signals are not independent, and the power of the segmented detector emerges in combinations among the channels.

Figure 10:
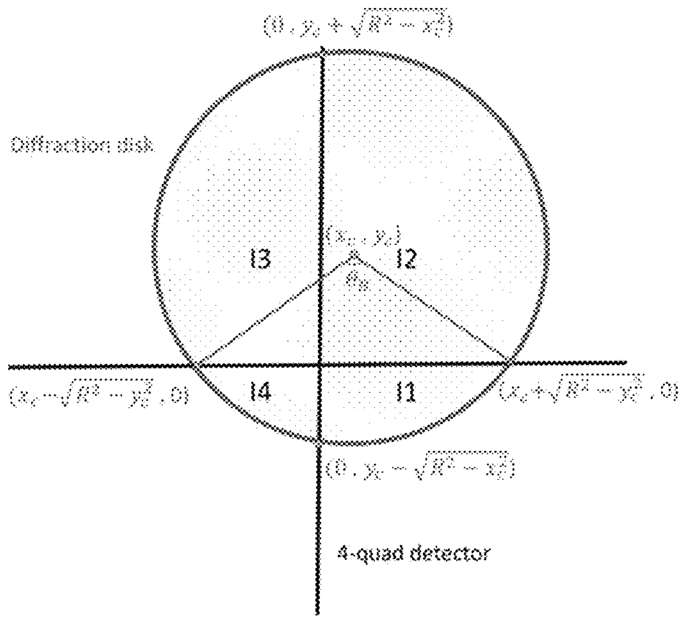
FIG. 10 schematically illustrates the analysis of the position of the uniform diffraction disk on a quadrant detector.

Reference is made to FIG. 10, schematically illustrating the analysis of the position of the uniform diffraction disk on a quadrant detector. The sum of four quadrant detector signals, I1, I2, I3 and I4, relates to the scattering amplitude and their differences to gradients of the phase shift. By definition, a signal $I_i$ is the raw current acquired by the i-th detector segment normalized by the total current of the incident beam. The segments are to be aligned with the scan direction at the sample plane, which due to the helical electron trajectory in the projection system may rotate in relation to the scan direction seen at the detector plane in image mode. After rotation transformation it is assumed that quadrant segments 1 and 2 are being placed at the x>0 half plane with respect to the sample scan, and the four segments are labeled counterclockwise.

The differential phase contrast (DPC) and the sum of annular bright field (ABF) signals can be found from the normalized quadrant signals and from the reciprocal vector $k_{BF}$ (corresponding to the extent of the bright field illumination cone) according to $$ABF = I1 + I2 + I3 + I4,$$

$$DPC_x = \frac{\pi k_{BF}}{4}(I1 + I2 - I3 - I4)/ABF,$$

$$DPC_y = \frac{\pi k_{BF}}{4}(I1 + I4 - I2 - I3)/ABF.$$

Normalization of the DPC components by the sum signal is a minor adaptation to the loss of intensity due to scattering. Approximately, DPC is related to the specimen phase (φ) delay according to:

$$DPC_x \approx \frac{1}{2\pi}\frac{\partial\varphi}{\partial x} \text{ and } DPC_y \approx \frac{1}{2\pi}\frac{\partial\varphi}{\partial y}.$$

Quadrant detectors are commonly used for laser alignment, or, for example, for measurement of tip displacement in atomic force microscopy. Unlike the Gaussian beam of a laser, STEM illumination projects a uniform diffraction disk with a sharp edge, for which the sensitivity of a quadrant detector to displacement differs in the cubic term [14].

In the following, a semi-analytical approach that allows accurate calculation of diffraction pattern displacements with a quadrant detector in STEM to mimic a proper position sensitive detector (PSD) is exemplified:

Assuming the diffraction disk is in focus and is uniform, the signal from the detector is proportional to the illuminated area within each quadrant. Adjacent quadrants form a half plane, and the area of intersection A between a round spot and the half plane is analytically determined by the radius R of the spot and the central angle θ measured at the circle center between the vertices of the half plane line cutting the circle:

$$A = \frac{1}{2}R^2(\theta - \sin\theta)$$

In FIG. 10 the relation applies, in one example, to angle $\theta_B$ and the area of intersection between the diffraction disk and quadrants 1 and 4. The area of the i-th quadrant detector illuminated by the diffraction disk is proportional to the signal acquired $I_i$.

Thus, the following equations are obtained for the ratio of the beam intensity G falling onto opposite half planes:

$$G_A = \frac{(I_1 + I_2) - (I_3 + I_4)}{I_1 + I_2 + I_3 + I_4} = \frac{\theta_A - \sin\theta_A}{\pi} - 1$$

$$G_B = \frac{(I_1 + I_4) - (I_2 + I_3)}{I_1 + I_2 + I_3 + I_4} = \frac{\theta_B - \sin\theta_B}{\pi} - 1$$

Using Newton's method with up to 10 iterations the angles $\theta_A$ and $\theta_B$ are determined accurately and rapidly. For example, starting from $\theta_{A[0]}=\pi G_A+\pi$, $$\theta_{A[i+1]} = \theta_{A[i]} - \frac{\pi G_A + \pi - \theta_{A[i]} + \sin\theta_{A[i]}}{-1 + \cos\theta_{A[i]}}$$

As seen in FIG. 10, the isosceles triangles formed by the circle center and the vertices of the circle with x and y axes, provide that:

$$\sin\frac{\theta_A}{2} = \frac{\sqrt{R^2 - x_c^2}}{R}$$

$$\sin\frac{\theta_B}{2} = \frac{\sqrt{R^2 - y_c^2}}{R}$$

From these equations it is simple to express the center location $x_c$, $y_c$ in terms of the angles and the radius, where the sign of the coordinates is retrieved from the sign of $G_A$ and $G_B$. Expanding sin $\theta_A$ and cos $\theta_A$ around π provides analytic expressions $$G_A \approx \frac{4x_c}{\pi R}\left(1 - \frac{1}{6}\frac{x_c^2}{R^2}\right) \text{ and } G_B \approx \frac{4y_c}{\pi R}\left(1 - \frac{1}{6}\frac{y_t^2}{R^2}\right),$$

showing the quadrature term is absent. The illumination cone in k space corresponds to the radius of the diffraction disk R, the camera length L (being the distance of the detector from the sample plane), and the wavelength λ as $$k_{BF} = \frac{R}{L\lambda}.$$

Based on the Fourier transform property:

$$F_{k_p}\{e^{i2\pi q\cdot r_p}\psi_{in}\} = F_{k_p - q}\{\psi_{in}\},$$

with phase gradient $$2\pi q = (\partial\varphi/\partial x, \partial\varphi/\partial y)$$

that is nearly constant, the diffracted beam appears uniform and shifted along the x-axis in according to the vector (∂φ/∂x, ∂φ/∂y).

The known linear approximation of the DPC, namely the phase gradient, can be reproduced as $$\frac{1}{2\pi}\frac{\partial\varphi}{\partial x} = q_x = \frac{x_c}{L\lambda} \approx \frac{\pi}{4}G_A k_{BF} \text{ and } \frac{1}{2\pi}\frac{\partial\varphi}{\partial y} \approx \frac{\pi}{4}G_B k_{BF}.$$

The signals $G_A$ and $G_B$ thus can be related to the $DPC_x$ and $DPC_y$ signals. The computed center location provides a direct measure of the intensity "center of mass" (COM) displacement for a thin specimen at focus.

It should be noted that at focus the $iDPC_\varphi^3$ term relates to the third order correction of the location of the diffraction disk. This leaves the quadratic term $iDPC_\varphi^2$ the main contribution that does not involve the disk location.

Figure 11:
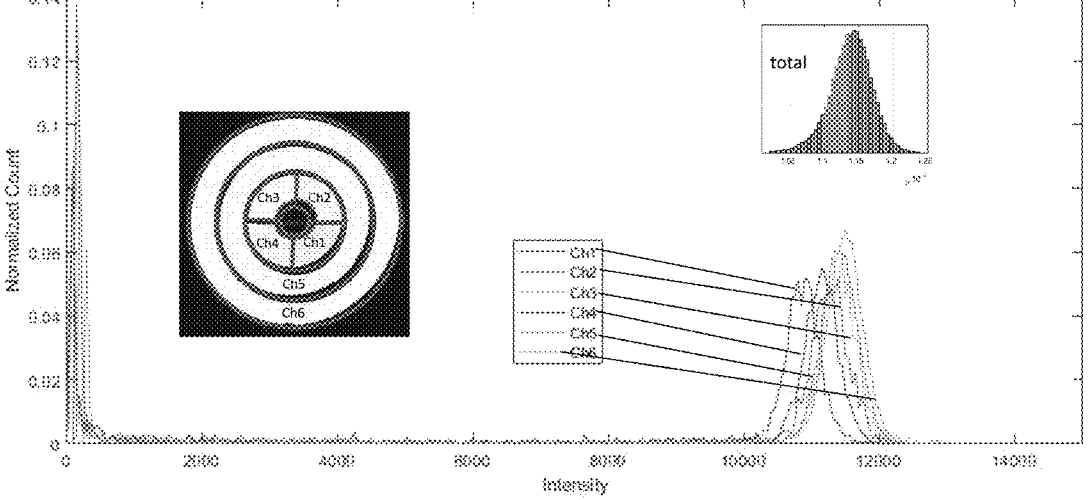
FIG. 11 exemplifies a histogram of the response of detector of FIG. 7B response in different channels.

The "Differential Phase Contrast" DPC evaluation presumes that the detector segment response is uniform. This is an advantageous property of diode-based detectors (such as that commercially available from Opal). FIG. 11 exemplifies a histogram of the response of such detector in different channels Ch1-Ch6. The inset in the figure shows the uniformity in response as a focused probe is scanned across the sensitive areas using direct scanning mode. Histograms of the intensities reported in each channel are found in the main plot. The variability in average response between the segments is less than 5%. The DPC calculation is valid also in the case that the quadrant segments are part of an annulus, rather than a disk, as long as the spot covers completely the inner diameter of the annulus and does not extend beyond the outer diameter. The microscope diffraction camera length is chosen to fulfill these conditions with the detector segments Ch1-4.

Operation of the quadrant detector as a position-sensitive detector (PSD) was tested by manually steering the beam using diffraction alignment controls and then comparing the response. The diffraction disk was steered manually using the microscope controls for diffraction alignment, and the x, y readings from the system status panel were recorded along with the average signals of the four segments extracted from a spiral scan. Based on the four average signals, the position of the diffraction disk was calculated detailed above.

Figure 12A:
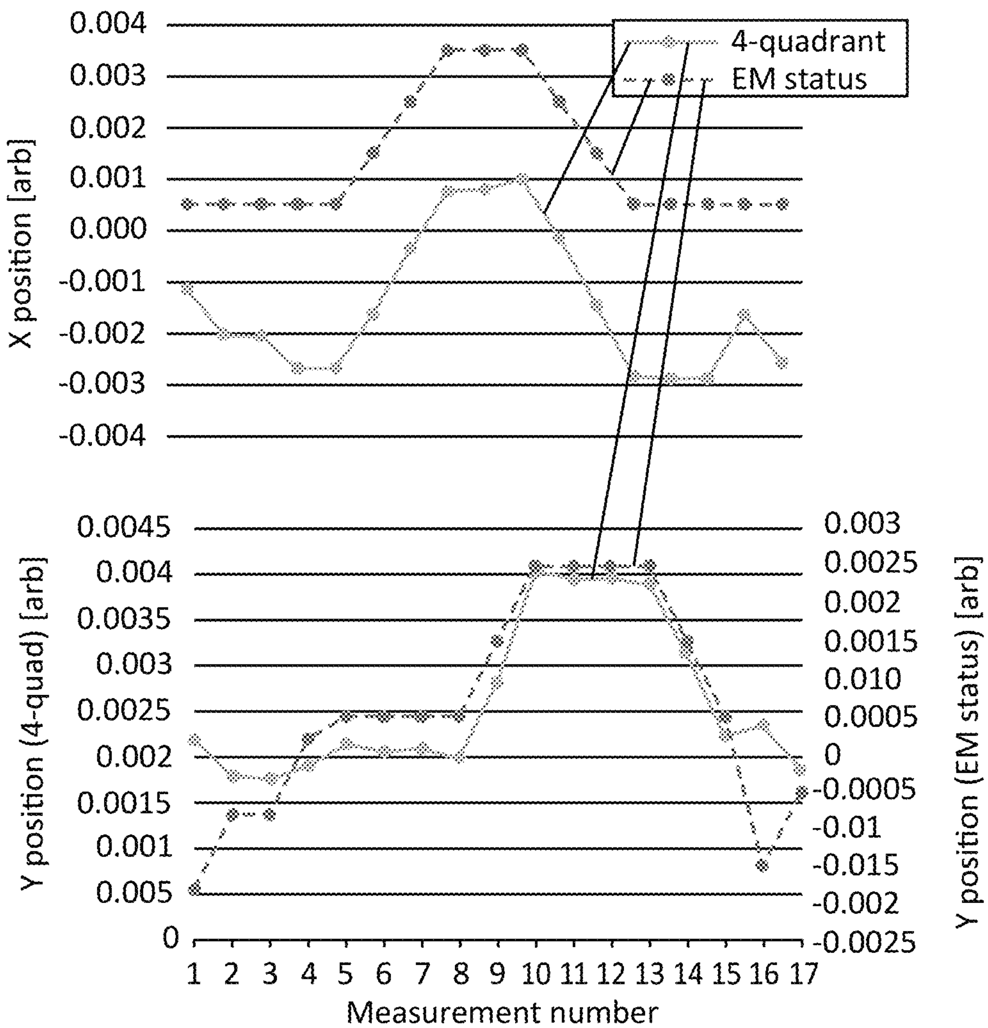
FIGS. 12A-12B illustrate comparison between diffraction disk position based on 4-quadrant analysis (continuous line) and based on the microscope diffraction shift status reading (broken line) in two cases where the beam is deflected statically using the control panel: without specimen, with lens renormalization per measurement (FIG. 12A), and with replica grating specimen inserted (FIG. 12B)
Figure 12B:
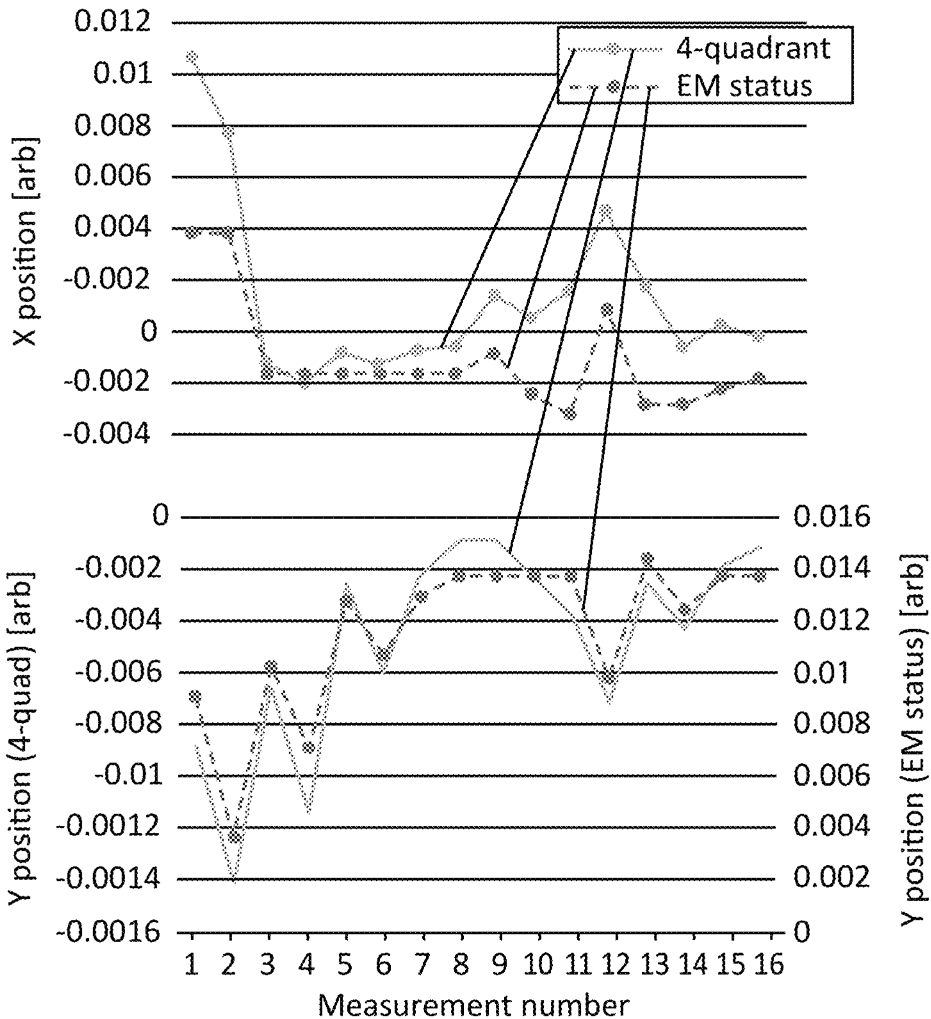

Reference is made to FIGS. 12A and 12B illustrating comparison between the diffraction disk position based on 4-quadrant analysis (continuous line) and based on the microscope diffraction shift status reading (broken line) in two cases: where the beam is deflected statically using the control panel without specimen, with lens renormalization per measurement (FIG. 12A) and with replica grating specimen inserted (FIG. 12B). In the first case (FIG. 12A), the probe was measured without a sample and each measurement was performed 3 seconds after lens renormalization. This demonstrates the close correspondence. It should be noted that the "status" values represent control voltages whereas the difference signals are real measurements. In the second case (FIG. 12B) the beam displacement was measured through a replica grating sample. This demonstrates that the signals remain well within range as the beam is displaced, so that the error signal may be used during scanning as a measure of COM displacement.

Figures 13A, 13B:
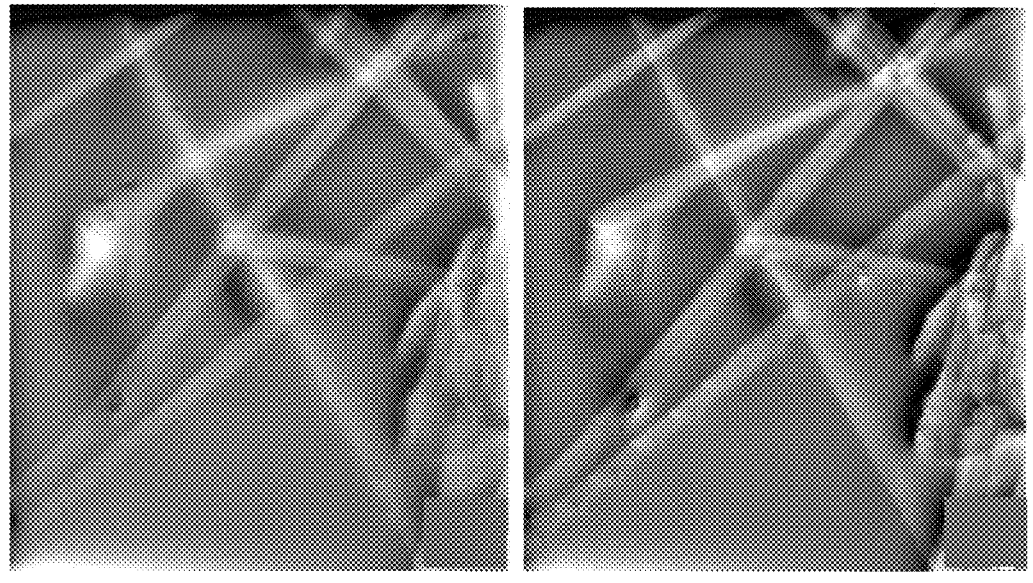
FIGS. 13A and 13B show, respectively, integrated differential phase contrast data, iDPC image, based on first and third order terms acquired by analyzing diffraction disk movements at focus; and iDPC image based on first and third order terms acquired by analyzing diffraction disk movements at −1.4 um defocus.

Phase images of the original/raw scan dataset, i.e. integrated differential phase contrast data (iDPC), were computed additionally based on the PSD signals, i.e. directly from the evaluation of the quadrant signals as a position sensitive detector. The images are shown in FIGS. 13A and 13B. Here, FIG. 13A shows the iDPC based on first and third order terms acquired by analyzing diffraction disk movements at focus; and FIG. 13B shows the iDPC image based on first and third order terms acquired by analyzing diffraction disk movements at −1.4 um defocus. It should be noted that the Bragg spots so prominent in the detector signals are almost perfectly removed in the analysis of the disk displacement.

The inventors have further demonstrated the capabilities of the data analysis technique of the presently disclosed subject matter for contrast enhancement by comparison and combination of multiple, simultaneously acquired detector segment signals. As a specimen a non-planar net of boron nitride (BN) nanotubes was used, scanned with a pseudo-spiral pattern of 2048×2048 pixels for 20 sec with a probe semi-convergence angle of 3.7 mrad. The camera length (calibrated to 1500 mm) was chosen so as to largely fill the inner quadrant segments A-D without overlap to the neighboring annular segment E, which then collects a dark-field signal (see detector of FIG. 7A). The accelerating voltage was 200 kV so the FWHM probe diameter was approximately 0.5 nm, sufficiently fine to show mean field phase gradients but not the steep footprint of individual atoms. In addition to mass-thickness contrast, there are discrete points of Bragg scattering coming from the unresolved lattice of the layered material.

Figures 14A, 14B, 14C, 14D:
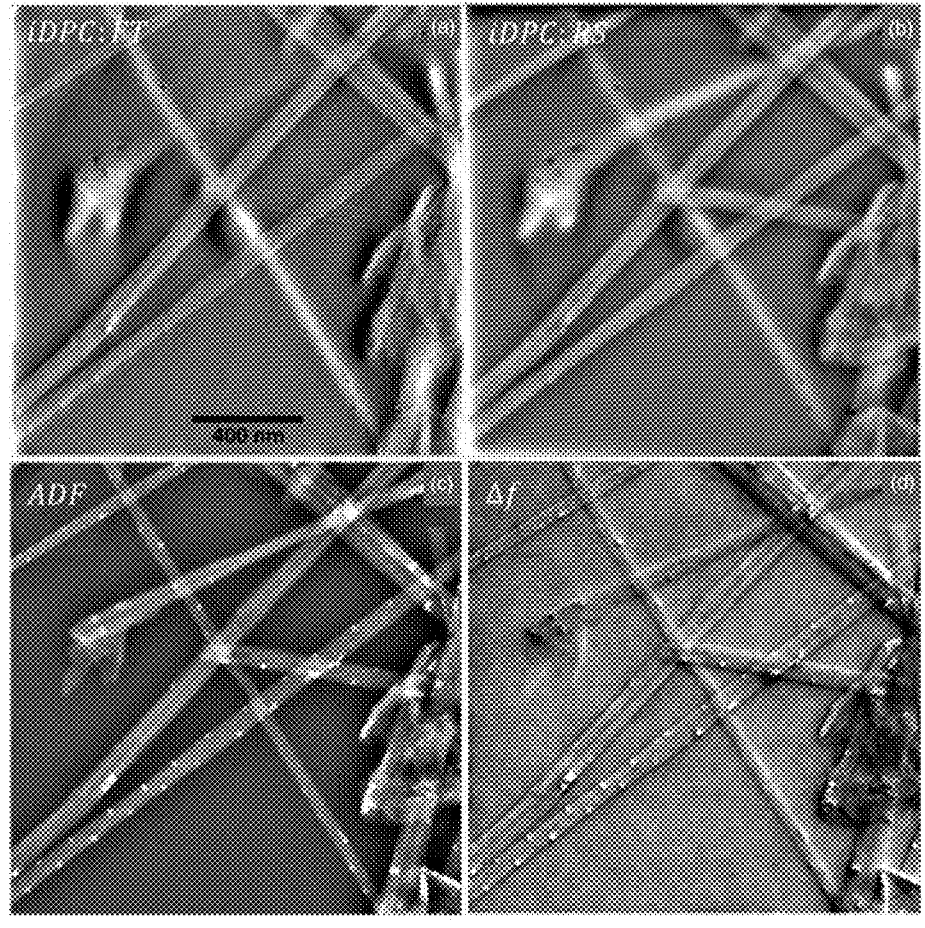

The respective image data is presented in FIGS. 14A-14D showing the transmission images of boron nitride nanotubes computed from the quadrant (segments A-D) and ADF (segment E) data. Here, FIG. 14A shows the iDPC phase shift by Fourier analysis (iDPC: FT), FIG. 14B shows the iDPC phase shift by real-space integration (iDPC: RS), FIG. 14C shows the ADF scan (ADF), and FIG. 14D shows the difference image from the sum of segments A-D at two defocus settings (Δf).

The iDPC image can be calculated according to $$\mathcal{F}_k\{iDPC\} = \frac{k\cdot\mathcal{F}_k\{\overrightarrow{DPC}\}}{2\pi i k^2}$$

as shown in [11], where the Fourier transform $\mathcal{F}$ and reciprocal vectors $\vec{k}$ are specified in 2D. Thus, the iDPC image in FIG. 14A was obtained from the imaginary part of the inverse transform of $k\cdot\mathcal{F}_k\{DPC\}/k^2$.

An additional Gaussian high pass filter at 0.01 $k_{BF}$ can be used to remove the lowest spatial frequencies that suffer from poor signal to noise ratio [10]. For the related iCOM, the Fourier integration method minimizes the noise contribution to the measurement of a conservative field [11].

An alternative route to obtain iDPC is by integration in real space, namely $$\varphi(x, y) = \int_0^x dxDPC_x + \int_0^y dyDPC_y + \text{regularization}$$

Specifically in the case of a DPC measurement, the vector field per se is not strictly conservative. As such, an elaboration on the real space integration implemented in a code called intgrad2 [12] is found useful. The code solves a set of 2*Nx*Ny equations with Nx*Ny variables $\varphi(x_i, y_i)$ using the backslash linear equation solver in Matlab. Thus, in the case of a non-conservative vector field, i.e.

$$\frac{\partial DPCx}{\partial y} \neq \frac{\partial DPCy}{\partial x},$$

the solution to the inconsistent gradient is obtained in a least-squares manner. This code was used to obtain the iDPC image shown in FIG. 14B (with the same high pass filter as in FIG. 14A).

In general, the difference in image details revealed by the two integration methods is small compared with the ADF image of FIG. 14C obtained from segment E. Both integration methods seem to be consistent in the signs of the phases in relation to zero mean, and, unlike the situation for phase contrast TEM, contrast certainly exists at low spatial frequencies. The inventors have found that the real space integration is somewhat preferable since objects appear more uniform with less ringing.

In FIG. 14D, phase contrast is retrieved in a manner akin to the phase shift extraction in TEM images described in [13]. The image is produced from the difference between one image in focus and another at a defocus of −1.4 μm. The inventors found empirically that the calculation in reciprocal space of the image with $k_p$ to the power of 1 (instead of 2 as in the TEM methods) renders the richest detail, namely $$I_{dif}(k_p) \propto \frac{1}{|k_p|^1} \frac{\Delta I(k_p)}{\Delta z}$$

The difference in power of $k_p$ in STEM compared to TEM can be explained using notation of the wavefunction $\psi = I^{1/2} e^{i\varphi}$ and the Transport of Intensity Equation that reads as $$\frac{2\pi}{\lambda} \frac{\partial I(x, y, z)}{\partial z} = -I\nabla^2_{x,y}\varphi - \nabla_{x,y} I \cdot \nabla_{x,y}\varphi.$$

The second term on the right-hand side is neglected in TEM images while in STEM it is dominant. Specifically the result can be explained based on simulations of the effective Contrast Transfer Function (CTF) for ABF detector [11].

The difference CTF(Δz)-CTF(0) for small defocus Δz depends linearly on the spatial frequency at the low range. Hence, the expression $$\frac{1}{|k_p|} \frac{\Delta I(k_p)}{\Delta z}$$

is nearly proportional to the Fourier transform of the phase and thus renders in real space the best image among powers of $k_p$.

The technique of the presently disclosed subject matter considers parallax effect manifested in image shifts with defocus. When comparing images from the four quadrant segments, a lateral shift that depends on defocus was observed. This is a wave phenomenon in the bright field; focus-dependent image shifts are not observed when the quadrant detector collects in the dark field.

According to the presently disclosed subject matter (in its either electron-beam or optical scan implementation), for an image acquired away from perfect focus, the shifted images of all the detector channels may be realigned ("de-shifted") to compensate the parallax. This is exemplified in FIGS. 15A-15F for defocus settings of −1.5 μm, −0.5 μm and 1.5 μm of STEM. Here, images of FIGS. 15A-15C correspond to readings of simple annular bright field (ABF) detector by summing signals directly from the four channels A,B,C,D. The blurring by defocus is severe in comparison to the ADF image that was acquired simultaneously on segment E. Images of FIGS. 15D-15F correspond to the same scans summed after parallax correction by aligning the images by cross-correlation. The resulting images are clearly sharper than the simple sum of images. In a tilted sample the defocus aberration could be corrected separately in two halves of the image.

The data analysis technique of the presently disclosed subject matter utilizes compensation for the parallax shift to provide an extended depth of field and suppress contrast inversion in the phase image. This can be better explained by testing some implications of Contrast Transfer Function (CTF) theory detailed below.

The mathematical description of the scan signal from thick samples can be described in an undisturbed probe model following [1] as an incoherent superposition of independent contributions from thin slices along the transmission direction, denoted by subscript l, each of which induces a phase delay $\Delta\varphi_l(x, y)$. The theory relies on the Born approximation across the entire sample, rather than an explicit weak phase approximation; hence the refractive index n is related to the phase delay within each layer as $$\Delta\varphi_l = \frac{2\pi\Delta z}{\lambda}(n_{(r_p,l)} - 1),$$

where Δz is the layer thickness and λ is the wavelength of the electron. In a two-dimensional Fourier space, the relation between the scan signal and the phase shift is written for iDPC as follows [11]:

$$\mathcal{F}_{k_p}\{I_{iDPC}\} = iDPC_\varphi + iDPC_{\varphi^2} + iDPC_{\varphi^3},$$

where each part is linearly dependent on the sample features via a contrast transfer function, which in turn depends on defocus lΔz and spatial frequency $k_p$ $$iDPC_\varphi = \Sigma_l CTF_{iS}(l\Delta z,\ k_p)\mathcal{F}_{k_p}\{\Delta\varphi_l\}$$

$$iDPC_{\varphi^2} = \sum_l CTF_{\varphi^2}(l\Delta z,\ k_p)\mathcal{F}_{k_p}\{\Delta(1 - \cos\varphi_l)\}$$

-continued $$iDPC_{\varphi^3} = \sum_l CTF_{\varphi^3}(l\Delta z,\ k_p)\mathcal{F}_{k_p}\{\Delta(\varphi_l - \sin\varphi_l)\}$$

The third order correction term $iDPC_{\varphi^3}$ is related to phase delays in the third power, and thus may be neglected in practice.

In case of the ADF detector:

$$\mathcal{F}_{k_p}\{I_{ADF}\} \approx c_{(R,W)}\overline{\mathcal{F}_{k_p}\{|\psi_{in}|^2\}}\Sigma_l\mathcal{F}_{k_p}\{\Delta(1-\cos\varphi_l)\},$$

where $\psi_{in}$ denotes the incident probe wavefunction. The prefactor c is assumed constant in a particular setup, and the ADF CTF may be defined as $$CTF_{ADF} \propto \overline{\mathcal{F}_{k_p}\{|\psi_{in}|^2\}}.$$

Understanding the role of the bright-field parallax in iDPC is key to its analysis for scan microscope imaging of thick samples. The inventors have calculated various CTFs based on the theory of [11] at various defoci and spatial frequencies.

The results are illustrated in FIGS. 16A-16D showing the calculation of CTF versus defocus at three spatial frequencies: $CTF_{iS}$ for the specific quadrant detector (FIG. 7B) with other parameters as described in the text (FIG. 16A), $CTF_{iS}$ for hypothetical quadrant detector without a central hole (FIG. 16B), and $CTF_{w2}$ under similar conditions (FIG. 16C), and CTF of ADF (modulo prefactor)—FIG. 16D.

The modeled detector geometry was chosen according to the dimensions of the detector of FIG. 7B commercially available from OPAL and details of the configuration used in the Tecnai T20-F microscope: spherical aberration $C_s$=2 mm, condenser C2 aperture 30 μm, camera length L=1500 mm, and wavelength λ=2.5 pm. At the corresponding semi-convergence angle of 3.7 mrad, with depth of field 180 nm, the contribution of the spherical aberration is practically negligible, rendering the CTF functions either symmetric or antisymmetric with defocus. $CTF_{iS}$, which relates to the first order term in iDPC, and $CTF_{ADF}$ are symmetric and resemble a sinc function; both attenuate similarly with increasing spatial frequency. Hence, the first term in iDPC is expected to be similar to iCOM, since iCOM is defined as a cross correlation between the probe intensity and the phase delay function.

Figures 16A, 16B:
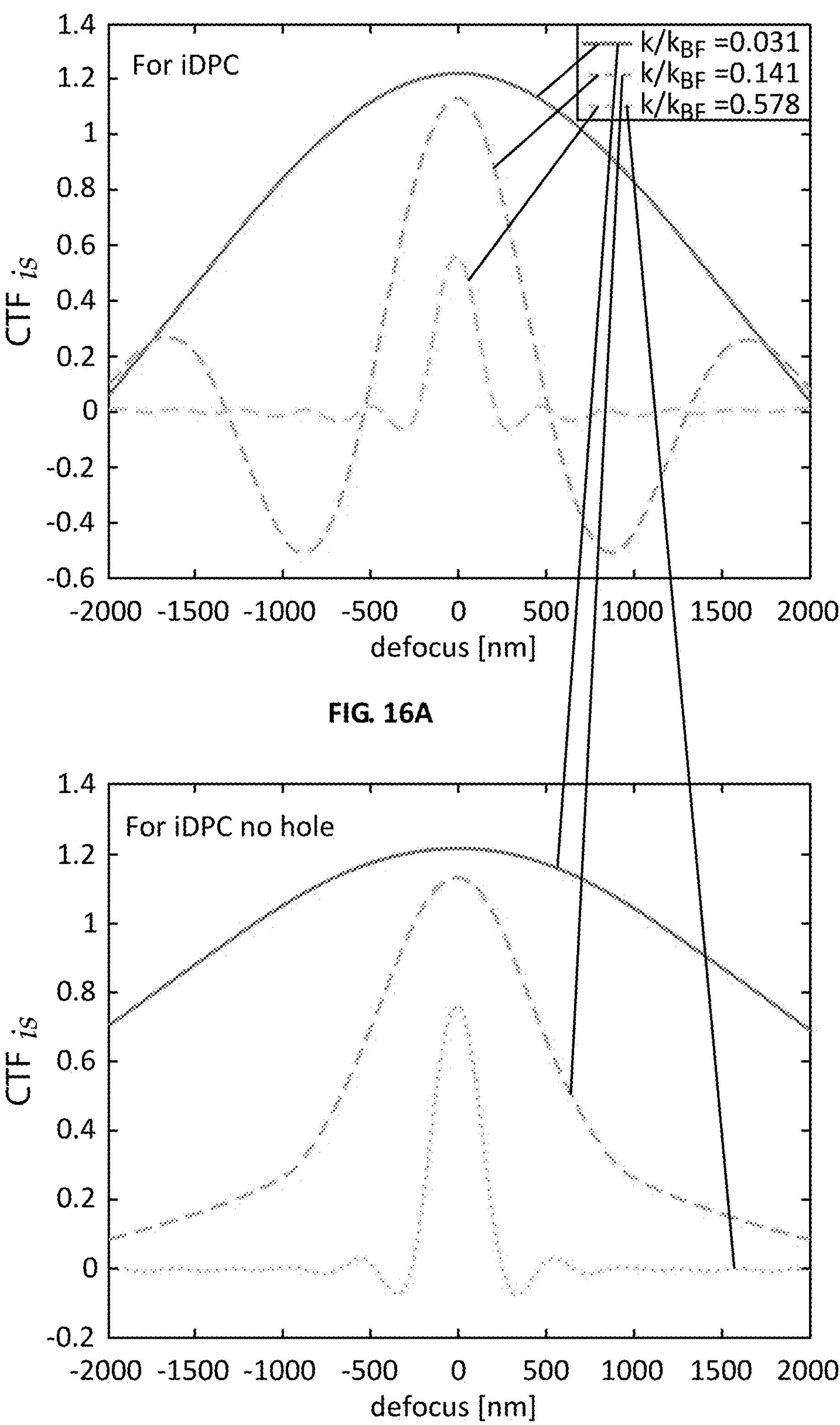
FIGS. 16A-16D show calculation of CTF versus defocus at three spatial frequencies. $CTF_{iS}$ for the specific quadrant detector of FIG. 7B with specific operational parameters (FIG. 16A); $CTF_{iS}$ for hypothetical quadrant detector without a central hole (FIG. 16B); $CTF_{\varphi 2}$ under similar conditions (FIG. 16C); CTF of ADF (modulo prefactor)—FIG. 16D.

In FIG. 16A, $CTF_{iS}$ is calculated for the above detector of FIG. 7B with its hole in the center, while the hypothetical case without a hole appears in FIG. 16B. Apparently, the hole introduces zero crossings to the CTF, yet the crossings are absent for defocus values smaller than the canonical depth of field defined by the convergence angle and wavelength.

Figure 16C:
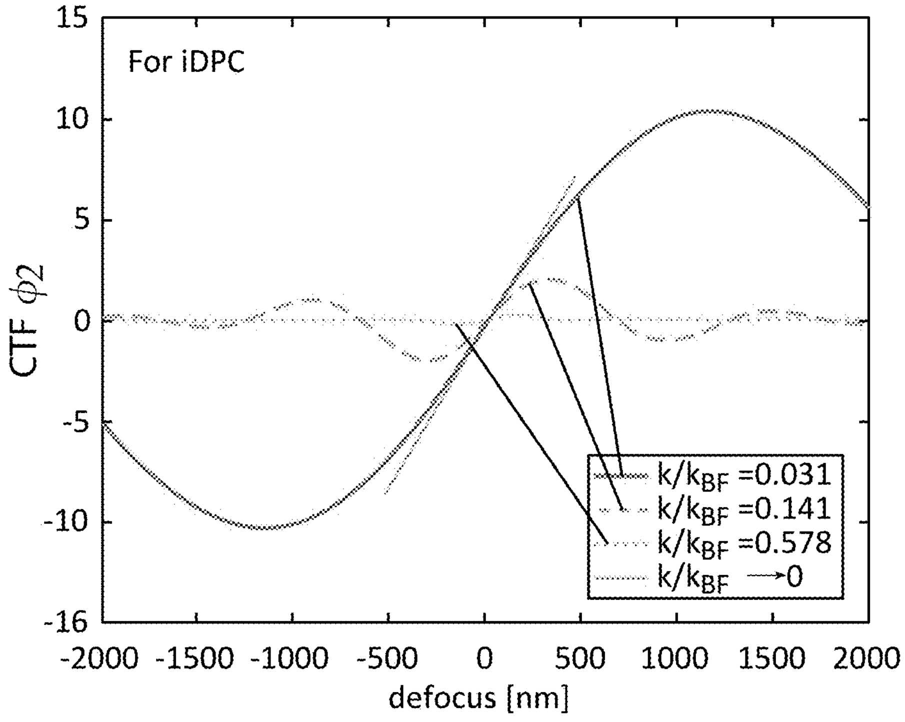
Figure 16D:
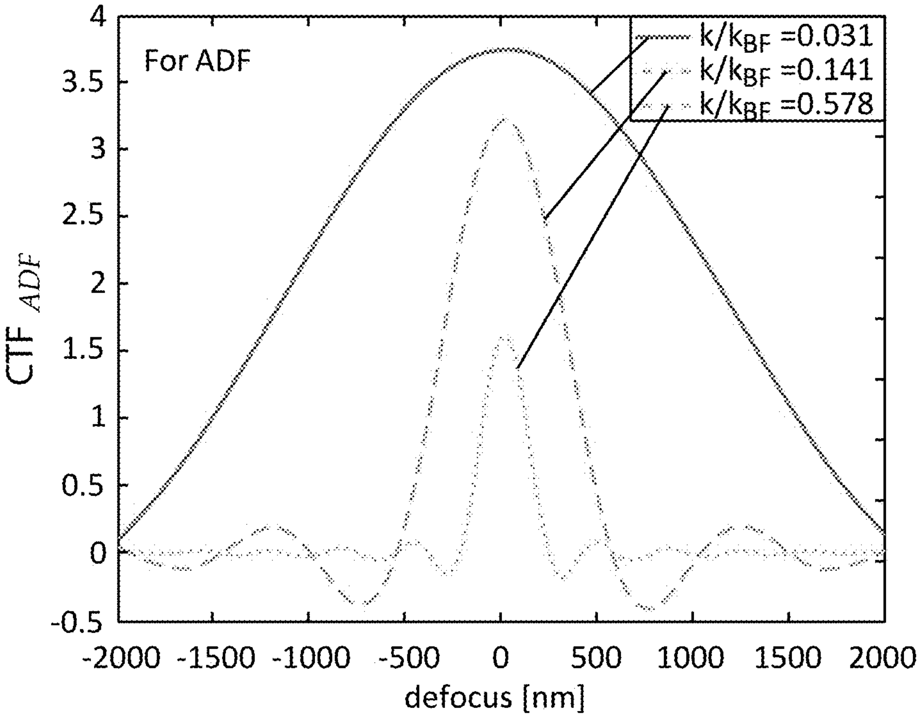

The second order term in iDPC, $CTF_{\varphi 2}$, is antisymmetric with defocus as seen in FIG. 16C. The $CTF_{\varphi 2}$ has the same number of extrema as zero crossings in $CTF_{ADF}$, counted on the defocus axis. Locations in defocus of the extrema in $CTF_{\varphi 2}$ and zero crossings in $CTF_{ADF}$ roughly match at high spatial frequencies. Hence, the second iDPC term provides complementary information to that of the ADF. Most significant is the emergence of a linear relation of $CTF_{\varphi 2}$ to defocus. The slope of $CTF_{\varphi 2}$ around the origin increases in value up to an asymptotic line at the lowest spatial frequency. The farther from focus, the stronger will be the low-frequency intensity, with inversion of sign around focus. This is strongly reminiscent of the image shifts by parallax described above.

In FIGS. 17A-17H the inventors computed the iDPC signal (with real space integration) from the datasets shown in FIGS. 15A-15F as bright field images. FIGS. 17A-17D show the $iDPC_{\varphi}$ part calculated based on aligned quadrant images, where the parallax contribution is compensated computationally (by "de-shifting"). FIGS. 17E-17H show the second part, $iDPC_{\varphi^2}$ (iDPC2 in FIGS. 1 and 2) which is calculated from the remainder of the iDPC signal, namely $iDPC_{\varphi^2}$=iDPC−$iDPC_{\varphi}$. As clearly seen in the figures, separation of iDPC parts reveals a constant part (FIGS. 17A-17D) related to phase or projected electric potential and a parallax induced part (FIGS. 17E-17H) related to depth or defocus; objects appear white in underfocus.

In the following, the formal relation between parallax offsets and iDPC CTF is elaborated to show that the $iDPC_{\varphi^2}$ part can be expanded as $$iDPC_{\varphi^2} \propto \sum l\Delta z\,\mathcal{F}_{k_p}\{\Delta(1-\cos\varphi_l)\} + O(k_p l\Delta z)^2,$$

so it is dominated by the parallax contribution.

In geometrical optics the wave aberration $e^{-i\chi(k)}$ of the condenser lens gives rise to an angular ray deflection resulting in a ray displacement $$\delta = \frac{1}{2\pi}\nabla_k\,\chi(k)$$

at the plane of the probe, where k is the spatial frequency in the diffraction plane, thus δ is in general a function of the off-axial position of the detector element. Assuming only defocus ΔZ and no other lens aberrations $$\delta = \lambda\Delta Z\ k.$$

The displacements are introduced to the scanning image depending on the accumulated signal on the detector plane. With the detector sensitivity W(k) the related ray displacements can be integrated to obtain an effective image shift $$S = \int d^2kW(k)\delta(k) \Big/ \int d^2kW(k)$$

with respect to the aberration-free image.

The image shift S for a detector of uniform sensitivity over the x>0 half plane will be opposite in value compared to the image shift of a detector over x<0 half plane.

Hence, there is a parallax offset between the images of different quadrant detectors, and thus DPC is affected by the image shift contribution. Yet, if two half planes are considered with a sensitivity similar to a COM sensor, namely $W(k)=k_x$, the two half planes reveal the same S values. This means that the COM sensor is insensitive to the focus-related parallax effect, as it will be for any even aberration in k.

The inventors have proven that the CTF of the second term of iDPC is formally related to the difference in image shifts thus providing the depth contrast image of the sample.

The main term in $CTF_{\varphi^2}$ of the iDPC image is the integrated $CTF_c$ in reciprocal space, related to the cosine of phase contribution to the DPC vector. Without restriction, only the x-component is considered, based on the detector sensitivity $W_x(k)$, and a similar result is obtained for the y-component. According to [11], the calculation is $$\overline{CTF_{c,x}} = -\mathcal{F}_k\{\psi_{in}(r)\mathcal{F}_r\{W_x\mathcal{F}_k^{-1}\{\overline{\psi_{in}(r)}\}\}\} - \mathcal{F}_k\{\overline{\psi_{in}(r)}\mathcal{F}_r^{-1}\{W_x\mathcal{F}_k\{\psi_{in}(r)\}\}\}$$

Using $$\psi_{in}(r) = \mathcal{F}_r\{A(k)e^{-i\chi}\}$$

and assuming even aberrations, $$\chi(k) = \chi(-k),$$

and a symmetric condenser aperture $$A(k) = A(-k) = \overline{A(k)}$$

the calculation is reduced to convolution terms:

$$\overline{CTF_{cx}} = -\mathcal{F}_k\{\psi_{in}(r)\} * \left[W_x(-k)A(k)e^{i\chi}\right] - \mathcal{F}_k\{\overline{\psi_{in}(r)}\} * \left[W_x(k)A(k)e^{-i\chi}\right]$$

For a small aberration phase shift the inventors approximate:

$$e^{i\chi} \approx 1 + ik_x\frac{\partial\chi}{\partial k_x},$$

hence $$\overline{CTF_{c,x}} = -\mathcal{F}_k\{\psi_{in}(r)\} * \left[W_x(-k)A(k)ik_x\frac{\partial\chi}{\partial k_x}\right] + \mathcal{F}_k\{\overline{\psi_{in}(r)}\} * \left[W_x(k)A(k)ik_x\frac{\partial\chi}{\partial k_x}\right].$$

Ignoring the convolution with the probe the CTF can be integrated over x- and y-components via $$CTF_{\varphi^2} \approx CTF_{ic} = \frac{CTF_{c,x}}{2\pi ik_x} + \frac{CTF_{c,y}}{2\pi ik_y}$$

Approaching k→0 the convolution is replaced with integration over k space, therefore $$CTF_{\varphi^2}(k=0) \approx \frac{1}{2\pi}\int\int dk_x dk_y|A(k)|^2\left\{\frac{\partial\chi}{\partial k_x}[W_x(k) - W_x(-k)] + \frac{\partial\chi}{\partial k_y}[W_y(k) - W_y(-k)]\right\} \propto (S_x^+ - S_x^-) + (S_y^+ - S_y^-)$$

Written in this form, the inventors observe that $CTF_{\varphi^2}$ at a low spatial frequency is proportional to the sum of image shift differences between the left and right quadrants as well as the image shifts between the upper and lower quadrants of the DPC detector. Thus, in the absence of lens aberrations the $CTF_{\varphi 2}$ of any symmetric four quadrant segments is expected to read:

$$CTF_{\varphi^2} \propto \lambda\Delta Z + O(k\Delta Z)^2.$$

Figures 17A, 17B, 17C, 17D, 17E, 17F, 17G, 17H:
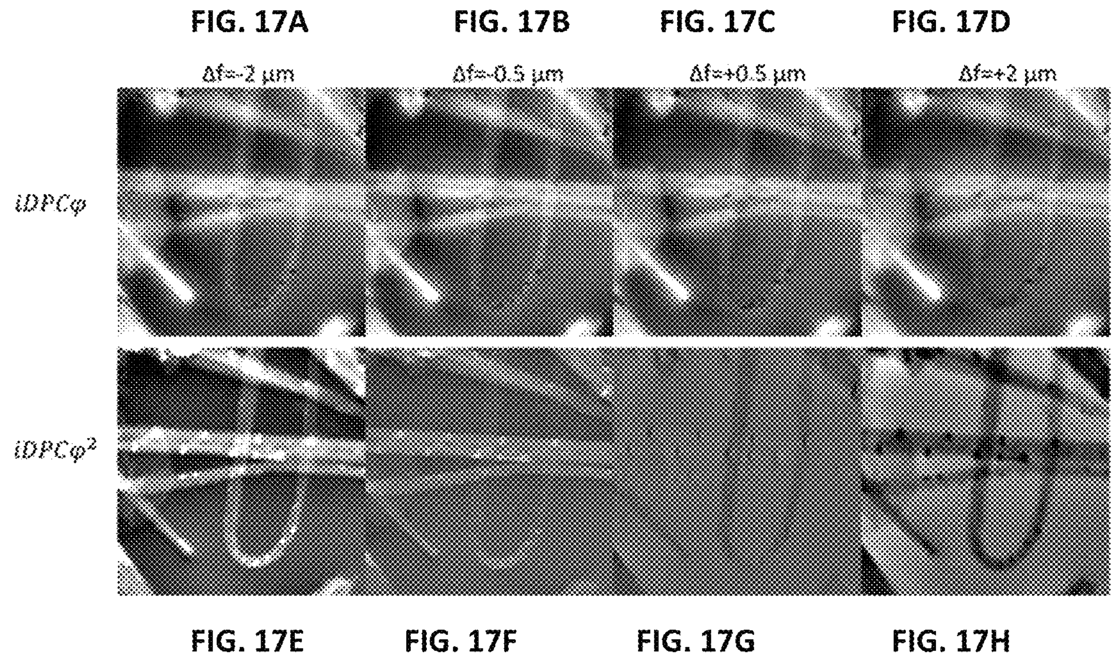

The above-described FIGS. 17A-17H demonstrate the principles of the presently disclosed subject matter resulting from a separate analysis of the various CTF contributions to the iDPC presented above. In particular, the figures reveal the understanding of the inventors that the contrast of first part ($iDPC_\varphi$) is almost unaffected by defocus, while the second part ($iDPC_{\varphi^2}$) is strongly affected. The first part is useful for tomography, especially since it is possible to deconvolve the image by the known contrast transfer function $CTF_{iS}$ at focus. The second part, $iDPC_{\varphi^2}$, provides relative height information instantly from a single scan. The inventors observe that the objects in the $iDPC\varphi^2$ image almost disappear at focus; in underfocus they are white, while in overfocus they are dark. It is also easy to appreciate which of the nanotubes is on top based on the difference in shades, for example as shown in FIG. 17F at Δf=0.5 μm.

Figures 15A, 15B, 15C, 15D, 15E, 15F:
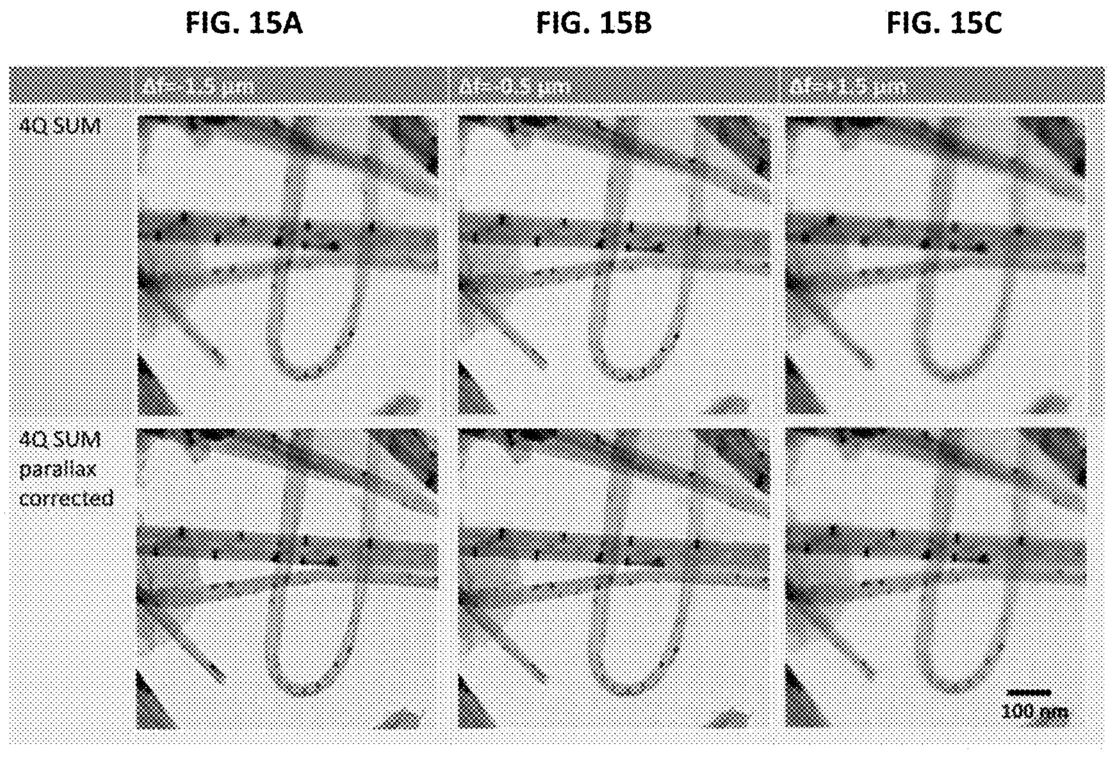
FIGS. 15A-15F illustrate focus extension in the sum images of the bright-field quadrants of the detector segments by compensating the parallax image shifts, for defocus settings: −1.5 μm, −0.5 μm, 1.5 μm, wherein FIGS. 15A-15C correspond to readings of simple annular bright field (ABF) detector by summing signals directly from the four channels A,B,C,D, and FIGS. 15D-15F correspond to the same scans summed after parallax correction by aligning the images by cross-correlation.

In the iDPCφ images of FIGS. 17A-17D, but not in the SUM images of FIGS. 15A-15C, a single significantly "bright" tip of a nanotube can be recognized where the image intensity extends beyond the material boundary. The same feature was not particularly noteworthy in the ABF images.

Figure 18:
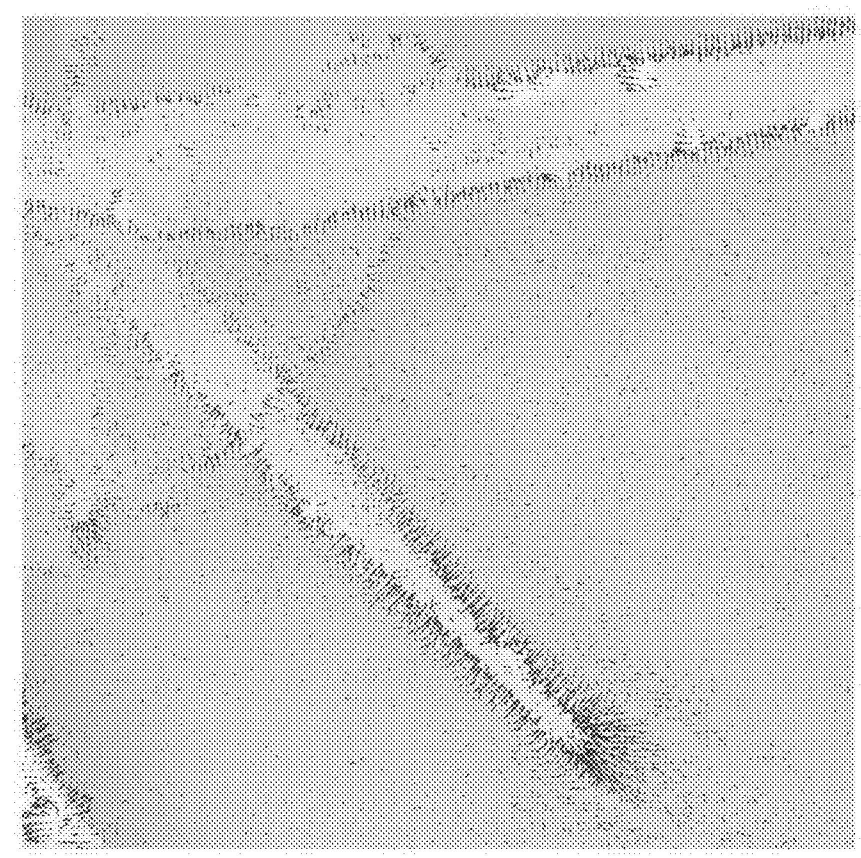
FIG. 18 shows DPC vector field (inverted) for part of the data in FIGS. 17A-17H, where high magnitude arrows are interpreted as electric field pointing toward accumulated negative charge.

FIG. 18 shows DPC vector field (inverted) for part of the data in FIGS. 17A-17H, determined from the raw DPCx and DPCy components, which relate to the phase gradient convolved with the probe. The high magnitude arrows are interpreted as electric field pointing toward accumulated negative charge. For scales larger than the probe diameter they reflect the local electric field along the scan direction. The direction and magnitude of the arrows indicate an electric field arising from excess negative charge accumulated on the boundary of the nanotube and at the sharp tip, which is aligned roughly along the circular scan trajectory. Charging by the electron beam is a common nuisance in scanning electron microscopy and STEM, yet the DPC vector representation offers a means to harness and possibly quantify it. Together with the capability of precise and compensated scan pattern there is a possibility to monitor charging dynamics and perhaps determine conductivity.

The technique of the presently disclosed subject matter can thus be advantageously implemented in a scanning microscope, and in particular in a standard S/TEM, by using there a multi-segment detector and applying the above-described data analysis of all the detection channels.

Also, as described above, the scan microscope operation can be improved by properly controlling the above-described parameters and conditions of the scan mode. The scan generator described above permits arbitrary scan patterns. The inventors have demonstrated scanning with minimal acceleration, as opposed to the conventional raster scan, and a correction algorithm providing to account for the delay of the probe position with respect to the drive signal. As a data collection system there are seven channels with simultaneous acquisition. These features in combination with the use of segmented detector, in particular diode detector, even more improves the STEM performance. Conventional bright field and high angle annular dark field signals were also recorded. Digitization speed is sufficient for significant over-sampling in time, which permits effective interpolation from the unconventional scan patterns to the Cartesian grid of a presentable image. The time stream can be saved for further analysis. The system has been programmed for compatibility with the popular SerialEM software package for microscope control and straightforward integration with sophisticated workflows.

The capabilities of multi-channel recording were explored in various combinations to generate contrast even from a weakly scattering specimen (like boron nitride nanotubes). Compensation of defocus image shifts from off-axis detector elements provides a simple separation of phase and depth contrast in iDPC. In comparison to iCOM, the method of de-shifted iDPC provides the depth information essentially for free. It should be understood that the principles of data analysis of the presently disclosed subject matter are neither limited to any number of multiple detection channels, as well any type of multi-segment detection used to provide the scan dataset. The data analysis system of the presently disclosed subject matter is applied as post-acquisition, and can thus be useful for analyzing data collected by any multi-channel detection.

The invention claimed is:

1. A computer system for determining a structural image of a sample, the computer system being configured for data communication with a measured data provider to receive raw measured data produced by a scanning microscope, the raw measured data being indicative of at least one scan dataset acquired in a scan session, the scan dataset $(I_M)_N$ corresponding to a sequence of N measurements on the sample located in proximity to a focal plane of the scanning microscope, each measurement including data provided by M detection channels associated with M-segment detector $(M \geq 3)$, the computer system comprising a data analyzer configured and operable to process said at least one scan dataset to compensate image shifts induced by off-axis detection channels for sample features at defocus plane to thereby obtain data indicative of parallax corrected scan image of the sample which enables separation between phase and depth information and extraction of a depth contrast image of the sample from the at least one scan dataset.

2. The computer system according to claim 1, wherein said data analyzer is further configured and operable to utilize said data indicative of the parallax corrected scan image and data indicative of integrated differential phase contrast of the scan dataset $(I_M)_N$ to extract the depth contrast image of the sample comprising signed intensity, bright and dark, indicative of a degree of defocus indicative of depth of features in the sample.

3. The computer system according to claim 1, wherein said data analyzer comprises:

a first data processor adapted to process the scan dataset $(I_M)_N$ and determine deshifted scan dataset $(I_1^{ds}, \ldots I_M^{ds})_N$, in which image shifts induced by off-axis detection channels for sample features at defocus plane are compensated; and further process the deshifted scan dataset to determine corresponding deshifted differential phase contrast data, $DPC^{ds}$, thereby providing said data indicative of the parallax corrected scan image of the sample.

4. The computer system according to claim 3, wherein said first data processor is further configured to determine, from said deshifted differential phase contrast data $DPC^{ds}$, corresponding integrated differential phase contrast data $iDPC_1$.

5. The computer system according to claim 4, wherein the data analyzer further comprises a second data processor adapted to utilize data indicative of integrated differential phase contrast image, iDPC, calculated from said raw scan dataset $(I_M)_N$ and determine a difference between the iDPC and $iDPC_1$ thereby extracting the depth contrast image of the sample.

6. The computer system according to claim 3, wherein said first data processor is adapted to process the scan dataset $(I_M)_N$ by carrying out the following:

identifying, in the scan dataset $(I_M)_N$, image $I_i$ (x,y) acquired by each i-th detection channel based on the N measurements along the scan, by mapping locations in the image according to a locations of a focused scan beam in a focal plane;

processing at least some of the images $I_i(x,y)$ of the scan dataset to determine an image shift $(\Delta x_i, \Delta y_i)$ between $I_i(x,y)$ and a hypothetical image corresponding to a central detection channel collectable by a central region of the detector on an optical axis defined by illumination path of the microscope, determining an opposite shift value and applying said opposite shift value to the image provided by each i-th detection channel $I_i(x,y)$ to thereby obtain deshifted scan dataset $(I_1^{ds}, \ldots I_M^{ds})$; and processing the deshifted images $(I_1^{ds}(x,y) \ldots I_m^{ds}(x,y))$ for all the detection channels to determine the differential phase contrast data $DPC^{ds}$, thereby compensating for defocus image shifts induced by the off-axis detection channels and provide data indicative of a parallax corrected scan image of the sample.

7. The computer system according to claim 6, wherein said opposite shift value is an average shift obtained from measurements by each of M detection channels along the scan, applied with an opposite sign to respective image $(I_i(x,y))_N$.

8. The computer system according to claim 6, wherein said determining of the image shift $(\Delta x_i, \Delta y_i)$ comprises: performing intersegment cross-correlations between signals $I_i$ and $I_j$ for at least some of pairs ij of the detection channels in said at least some of the images of the scan dataset and determining $\Delta x_{ij}$ and $\Delta y_{ij}$; and determining the image shift $(\Delta x_i, \Delta y_i)$ from a best fit condition.

9. The computer system according to claim 6, wherein the data analyzer is further configured to carry out at least one of the following: determine a degree of defocus $\Delta z$ by applying a model based analysis to the image shift $(\Delta x_i, \Delta y_i)$ data, using a predetermined model describing a relation between an image shift and defocus and dominant aberrations; and utilize the image shifts and provide a depth-labeled phase contrast image for each selected region of interest of the scan image.

10. The computer system according to claim 3, wherein said data analyzer is further configured to determine a sum of intensity signals of deshifted images $(I_1^{ds}(x,y) \ldots I_m^{ds}(x,y))$ for all M detection channels, in each of said N measurements of the scan dataset, providing extended depth of field.

11. The computer system according to claim 1, wherein said raw measured data is obtained from one of the following: a scanning transmission electron microscope (STEM) utilizing said M-segment detector; or a scanning confocal microscope utilizing said M-segment detector.

12. The computer system according to claim 1, configured for the data communication with a storage device where the raw measured data is stored and provided.

13. The computer system according to claim 12, wherein said storage device is associated with a scanning microscope performing said measurements.

14. An imaging system comprising:

a scanning microscope unit including a scan unit for probing a sample plane by radiation and a detection unit comprising an M-segment detector (M≥3) located in a Fourier plane with respect to a focal plane of the scan unit for detecting the radiation transmitted through the sample and generating measured data comprising scan dataset $(I_M)_N$ corresponding to a sequence of N measurements on a sample located in proximity to a focal plane of the scanning microscope acquired in a scan session, each measurement including M detection channels associated with said M-segment detector; and a control unit comprising the computer system of claim 1.

15. The imaging system according to claim 14, wherein said radiation is electron beam radiation.

16. The imaging system according to claim 15, wherein the scan unit has one of the following configurations: is configured to produce a raster scan; or is configured to produce a pseudo-spiral scan or a circular scan pattern thereby minimizing changes in probe acceleration.

17. The imaging system according to claim 15, wherein said detection unit comprises a six-segment detector structure, the six segments including four-quadrant detector segments and concentrically arranged surrounding annular ring segments.

18. The imaging system according to claim 17, wherein the detection unit further comprises at least one of the following: a bright field detector aligned with a central aperture region of said six-segment detector structure, and a high angle annular dark field (HAADF) detector.

19. The imaging system according to claim 14, wherein said radiation is optical radiation.

20. The imaging system according to claim 19, characterized by at least one of the following: said scanning microscope unit has a confocal configuration; and the scan unit is configured to produce a raster scan.

21. A method for use in reconstruction of a structural image of a sample, the method comprising:

Providing raw measured data indicative of at least one scan dataset $(I_M)_N$, the scan dataset being obtained in a scan session performed by a scanning microscope and corresponding to a sequence of N measurements on the sample located in proximity to a focal plane of the scanning microscope, each measurement including data acquired by M detection channels associated with M-segment detector (M≥3);

processing and analyzing said at least one scan dataset to compensate image shifts induced by off-axis detection channels for sample features at defocus plane to thereby obtain data indicative of parallax corrected scan image of the sample which enables separation between phase and depth information and extraction of a depth contrast image of the sample from the at least one scan dataset.

22. The method according to claim 21, further comprising utilizing said data indicative of the parallax corrected scan image and data indicative of integrated differential phase contrast of the scan dataset $(I_M)_N$ to extract the depth contrast image of the sample comprising signed intensity, bright and dark, indicative of a degree of defocus corresponding to depth of features in the sample.

23. The method according to claim 21, wherein said processing and analyzing comprises:

processing the scan dataset $(I_M)_N$ and determining deshifted scan dataset $(I_1^{ds}, \ldots I_M^{ds})$, in which image shifts induced by off-axis detection channels for sample features at defocus plane are compensated;

processing the deshifted scan dataset to determine corresponding deshifted differential phase contrast data $DPC^{ds}$, thereby providing said data indicative of the parallax corrected scan image of the sample.

24. The method according to claim 23, further comprising determining, from said deshifted differential phase contrast data $DPC^{ds}$, corresponding integrated differential phase contrast data $iDPC_1$.

25. The method according to claim 24, further comprising utilizing data indicative of integrated differential phase contrast image, iDPC, calculated from said raw scan dataset $(I_M)_N$ and determining a difference between the iDPC and the $iDPC_1$ thereby extracting said depth contrast image of the sample.

26. The method according to claim 23, wherein said processing of the scan dataset $(I_M)_N$ to determine the deshifted scan dataset $(I_1^{ds}, \ldots I_M^{ds})_N$, comprises:

Identifying, in the scan dataset, image $I_i(x,y)$ acquired by each i-th detection channel based on the N measurements along the scan, by mapping locations in the image according to a locations of a focused scan beam in a focal plane;

processing at least some of the images $I_i(x,y)$ of the scan dataset to determine an image shift $(\Delta x_i, \Delta y_i)$ between $I_i(x,y)$ from an image corresponding to a central detection channel collectable by a central region of the detector intersecting with an optical axis defined by illumination path of the microscope, determining an opposite shift value and applying said opposite shift value to the image provided by each i-th detection channel $I_i(x,y)$ to thereby obtain deshifted scan dataset $(I_1^{ds}, \ldots I_M^{ds})$; and processing the deshifted images $(I_1^{ds}(x,y) \ldots I_m^{ds}(x,y))$ for all the detection channels to determine the differential phase contrast data $DPC^{ds}$, thereby compensating for defocus image shifts induced by the off-axis detection channels and provide data indicative of a parallax corrected scan image of the sample.

27. The method according to claim 26, characterized by at least one of the following: said determining of the image shift $(\Delta x_i, \Delta y_i)$ comprises: performing intersegment cross-correlations between each $I_i$ and $I_j$ for at least some of pairs ij of the detection channels in the at least some of N measurements and determining $\Delta x_{ij}$ and $\Delta y_{ij}$; and determining the image shift $(\Delta x_i, \Delta y_i)$ from a best fit condition; and said processing and analyzing comprises determining a degree of defocus $\Delta z$ by applying a model based analysis to the image shift $(\Delta x_i, \Delta y_i)$ data, using a predetermined model describing a relation between an image shift and defocus and dominant aberrations.

28. The method according to claim 23, wherein said processing and analyzing further comprises determining a sum of intensity signals of deshifted images $(I_1^{ds}(x,y) \ldots I_m^{ds}(x,y))$ for all M detection channels, in each of said N measurement of the scan dataset.

* * * * *